(12) United States Patent
Aoki

(10) Patent No.: US 10,968,807 B2
(45) Date of Patent: Apr. 6, 2021

(54) CATALYST DETERIORATION DETECTION SYSTEM

(71) Applicant: TOYOTA JIDOSHA KABUSHIKI KAISHA, Toyota (JP)

(72) Inventor: Keiichiro Aoki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/212,945

(22) Filed: Dec. 7, 2018

(65) Prior Publication Data

US 2019/0178144 A1 Jun. 13, 2019

(30) Foreign Application Priority Data

Dec. 12, 2017 (JP) .............................. JP2017-237543

(51) Int. Cl.
*F01N 11/00* (2006.01)
*F02D 41/14* (2006.01)
(Continued)

(52) U.S. Cl.
CPC .......... *F01N 11/007* (2013.01); *F02D 41/123* (2013.01); *F02D 41/1439* (2013.01);
(Continued)

(58) Field of Classification Search
CPC ............... F01N 11/007; F01N 2430/06; F01N 2550/00; F01N 2550/02; F01N 2560/025; F01N 2900/1402; F02D 41/1439; F02D 41/123; F02D 41/1454; F02D 41/1475; F02D 2200/0816; F02D 41/042; G01M 15/104

See application file for complete search history.

(56) References Cited

U.S. PATENT DOCUMENTS 4,596,164 A * 6/1986 Hasegawa ........... F02D 41/1475
123/478
5,784,879 A * 7/1998 Dohta ................... F01N 11/007
60/276

(Continued)

FOREIGN PATENT DOCUMENTS

| JP | 2014-145308 | 8/2014 |
|---|---|---|
| JP | 2015-86861 | 5/2015 |
| JP | 2019-35355 A | 3/2019 |

*Primary Examiner* — Matthew T Largi
(74) *Attorney, Agent, or Firm* — Oblon, McClelland, Maier & Neustadt, L.L.P.

(57) ABSTRACT

A catalyst deterioration detection system 1 comprises an air-fuel ratio sensor 41, a current detection device 61, a voltage application device 60, a voltage control part 71, an air-fuel ratio control part 72 and a deterioration judging part 73. The air-fuel ratio control part executes fuel cut control, and, after the fuel cut control, executes rich control. The voltage control part, if judging that the air-fuel ratio of the outflowing exhaust gas has reached the stoichiometric air-fuel ratio when setting the applied voltage to a first voltage in a limit current region during the rich control, changes the applied voltage from the first voltage to a second voltage in a limit current region. The deterioration judging part judges the degree of deterioration of the catalyst based on the output current of the air-fuel ratio sensor when the applied voltage is set to the second voltage.

12 Claims, 13 Drawing Sheets

(51) Int. Cl.
*G01M 15/10* (2006.01)
*F02D 41/12* (2006.01)
*F02D 41/04* (2006.01)

(52) U.S. Cl.
CPC ..... *F02D 41/1454* (2013.01); *F02D 41/1475* (2013.01); *G01M 15/104* (2013.01); *F01N 2430/06* (2013.01); *F01N 2550/00* (2013.01); *F01N 2550/02* (2013.01); *F01N 2560/025* (2013.01); *F01N 2900/1402* (2013.01); *F02D 41/042* (2013.01); *F02D 2200/0816* (2013.01)

(56) References Cited

U.S. PATENT DOCUMENTS

| | | | |
|---|---|---|---|
| 2013/0206596 A1* | 8/2013 | Katsurahara | F02D 41/1441 204/424 |
| 2015/0086428 A1 | 3/2015 | Kitaura et al. | |
| 2015/0330323 A1 | 11/2015 | Aoki | |
| 2015/0354487 A1* | 12/2015 | Sasaki | F02D 41/1477 60/285 |
| 2016/0131064 A1* | 5/2016 | Hayashita | F02D 41/1441 73/1.06 |
| 2016/0138506 A1* | 5/2016 | Miyamoto | F01N 11/007 60/276 |
| 2016/0160778 A1* | 6/2016 | Miyamoto | F02D 41/1439 60/276 |
| 2016/0215717 A1* | 7/2016 | Nakagawa | F02D 41/0002 |
| 2019/0048775 A1 | 2/2019 | Aoki | |

* cited by examiner

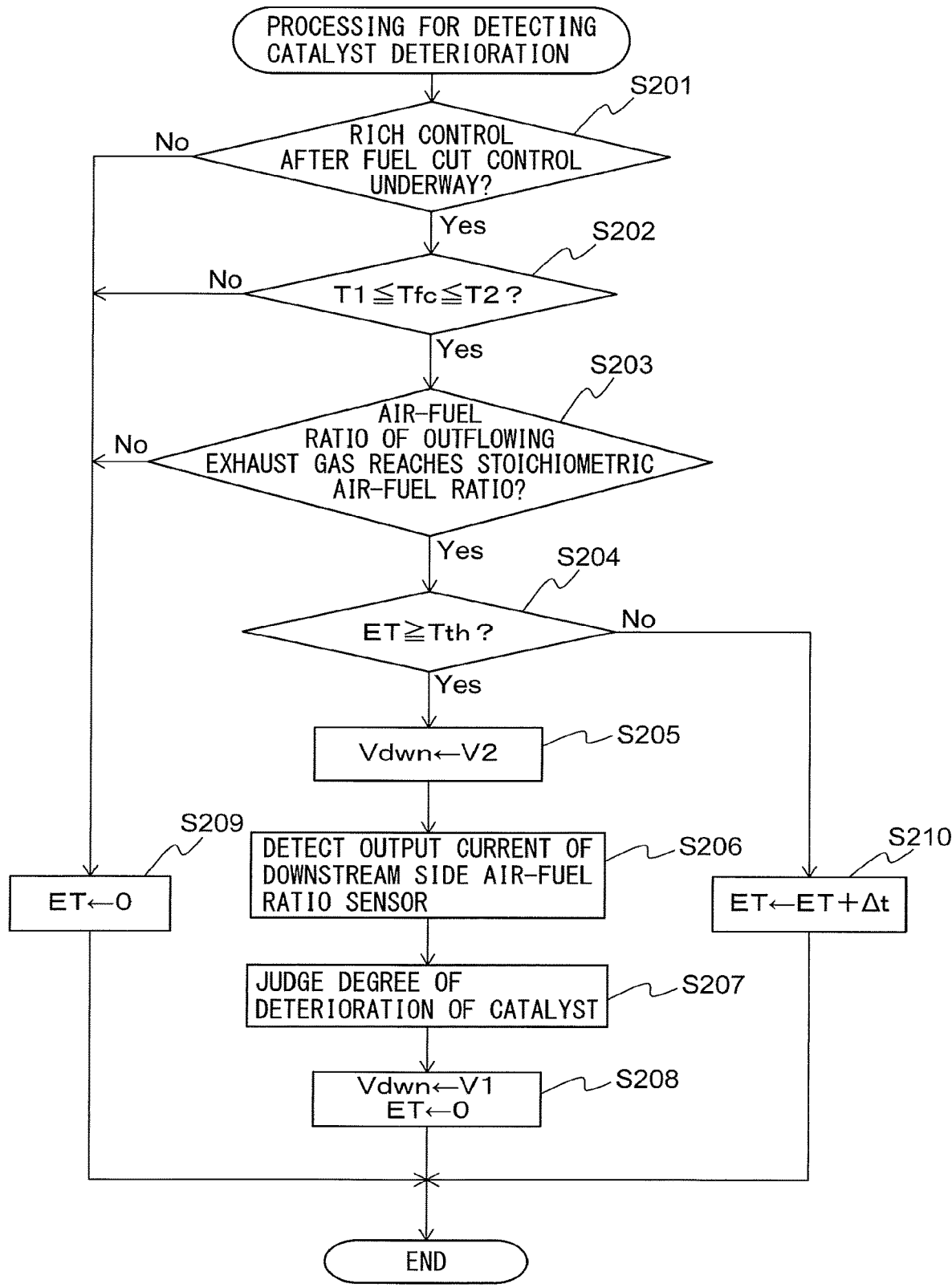

CATALYST DETERIORATION DETECTION SYSTEM

FIELD

The present invention relates to a catalyst deterioration detection system.

BACKGROUND

In general, in an exhaust passage of an internal combustion engine, a catalyst is provided for purifying the exhaust gas discharged from the internal combustion engine. As such a catalyst, a catalyst having an oxygen storage ability is known. A catalyst having an oxygen storage ability can remove the unburned gases (HC, CO, etc.) and $NO_X$ in the exhaust gas flowing into the catalyst when the oxygen storage amount is a suitable amount smaller than a maximum oxygen storage amount.

However, a catalyst deteriorates due to long term use etc. If a catalyst deteriorates, the maximum oxygen storage amount of the catalyst becomes smaller and the exhaust purification performance of the catalyst falls, so the exhaust emission deteriorates. For this reason, to suppress deterioration of the exhaust emission due to deterioration of a catalyst, it is desirable to be able to detect deterioration of the catalyst.

In an abnormality diagnosis device of an internal combustion engine described in PTL 1, the maximum oxygen storage amount of the catalyst is calculated and the degree of deterioration of the catalyst is judged based on the calculated maximum oxygen storage amount. In such an abnormality diagnosis device, to calculate the maximum oxygen storage amount of the catalyst, the oxygen storage amount of the catalyst is made to fluctuate between zero and the maximum oxygen storage amount by active air-fuel ratio control alternately switching the target air-fuel ratio of the exhaust gas flowing into the catalyst between a rich air-fuel ratio and a lean air-fuel ratio.

CITATION LIST

Patent Literature

[PTL 1] Japanese Unexamined Patent Publication No. 2015-086861

SUMMARY

Technical Problem

In active air-fuel ratio control, the target air-fuel ratio is made a lean air-fuel ratio until the air-fuel ratio detected by the downstream side air-fuel ratio sensor arranged at the downstream side of the catalyst reaches a lean judged air-fuel ratio leaner than the stoichiometric air-fuel ratio. For this reason, the oxygen storage amount of the catalyst reaches the maximum oxygen storage amount and $NO_X$ flows out from the catalyst. Further, in active air-fuel ratio control, the target air-fuel ratio is made a rich air-fuel ratio until the air-fuel ratio detected by the downstream side air-fuel ratio sensor arranged at the downstream side of the catalyst reaches a rich judged air-fuel ratio richer than the stoichiometric air-fuel ratio. For this reason, the oxygen storage amount of the catalyst reaches zero and unburned gases flow out from the catalyst. Therefore, in the abnormality diagnosis device described in PTL 1, the exhaust emission deteriorates when detecting deterioration of the catalyst.

Therefore, an object of the present invention is to provide a catalyst deterioration detection system able to keep exhaust emission from deteriorating while detecting deterioration of a catalyst.

Solution to Problem

The summary of the present disclosure is as follows.

(1) A catalyst deterioration detection system detecting deterioration of a catalyst arranged in an exhaust passage of an internal combustion engine and able to store oxygen, comprising: an air-fuel ratio sensor arranged at a downstream side of the catalyst and detecting an air-fuel ratio of outflowing exhaust gas flowing out from the catalyst; a current detection device detecting an output current of the air-fuel ratio sensor; a voltage application device applying a voltage to the air-fuel ratio sensor; a voltage control part configured to control the voltage applied to the air-fuel ratio sensor via the voltage application device; an air-fuel ratio control part configured to control an air-fuel ratio of inflowing exhaust gas flowing into the catalyst; and a deterioration judging part configured to judge a degree of deterioration of the catalyst, wherein the air-fuel ratio control part is configured to execute fuel cut control, in which supply of fuel to a combustion chamber of the internal combustion engine is stopped, when a predetermined execution condition is satisfied, and, after the fuel cut control, execute rich control making the air-fuel ratio of the inflowing exhaust gas richer than a stoichiometric air-fuel ratio, the voltage control part is configured to, if judging that the air-fuel ratio of the outflowing exhaust gas has reached the stoichiometric air-fuel ratio when setting the applied voltage to a first voltage in a limit current region during the rich control, change the applied voltage from the first voltage to a second voltage in a limit current region, and the deterioration judging part is configured to judge the degree of deterioration of the catalyst based on the output current of the air-fuel ratio sensor detected by the current detection device when the applied voltage is set to the second voltage.

(2) The catalyst deterioration detection system described in above (1), wherein the first voltage is a voltage whereby the output current of the air-fuel ratio sensor becomes zero when the air-fuel ratio of the outflowing exhaust gas is the stoichiometric air-fuel ratio, and the voltage control part is configured to judge that the air-fuel ratio of the outflowing exhaust gas has reached the stoichiometric air-fuel ratio when the output current of the air-fuel ratio sensor become zero.

(3) The catalyst deterioration detection system described in above (1) or (2), wherein the deterioration judging part is configured to judge the degree of deterioration of the catalyst based on the output current of the air-fuel ratio sensor detected by the current detection device when an elapsed time from when it is judged during the rich control that the air-fuel ratio of the outflowing exhaust gas has reached the stoichiometric air-fuel ratio reaches a reference time and the applied voltage is set to the second voltage, and the reference time is 100 ms to 1 second.

(4) The catalyst deterioration detection system described in any one of above (1) to (3), wherein if the catalyst has a characteristic of deterioration whereby an amount of fluctuation of a rate of purification of unburned gases when an air-fuel ratio on a surface of the catalyst is made near the stoichiometric air-fuel ratio becomes larger than an amount of fluctuation of a rate of purification of $NO_X$, the deterioration judging part is configured to judge that the degree of deterioration of the catalyst is larger the smaller the output current of the air-fuel ratio sensor detected by the current detection device.

(5) The catalyst deterioration detection system described in any one of above (1) to (3), wherein if the catalyst has a characteristic of deterioration whereby an amount of fluctuation of a rate of purification of $NO_X$ when an air-fuel ratio on a surface of the catalyst is made near the stoichiometric air-fuel ratio becomes larger than an amount of fluctuation of a rate of purification of unburned gas, the deterioration judging part is configured to judge that the degree of deterioration of the catalyst is larger the larger the output current of the air-fuel ratio sensor detected by the current detection device.

Advantageous Effects of Invention

According to the present invention, there is provided a catalyst deterioration detection system able to keep exhaust emission from deteriorating while detecting deterioration of a catalyst.

BRIEF DESCRIPTION OF DRAWINGS

FIG. 16 is a flow chart showing a control routine of processing for detecting deterioration of a catalyst in a second embodiment of the present invention.

DESCRIPTION OF EMBODIMENTS

Figure 1:
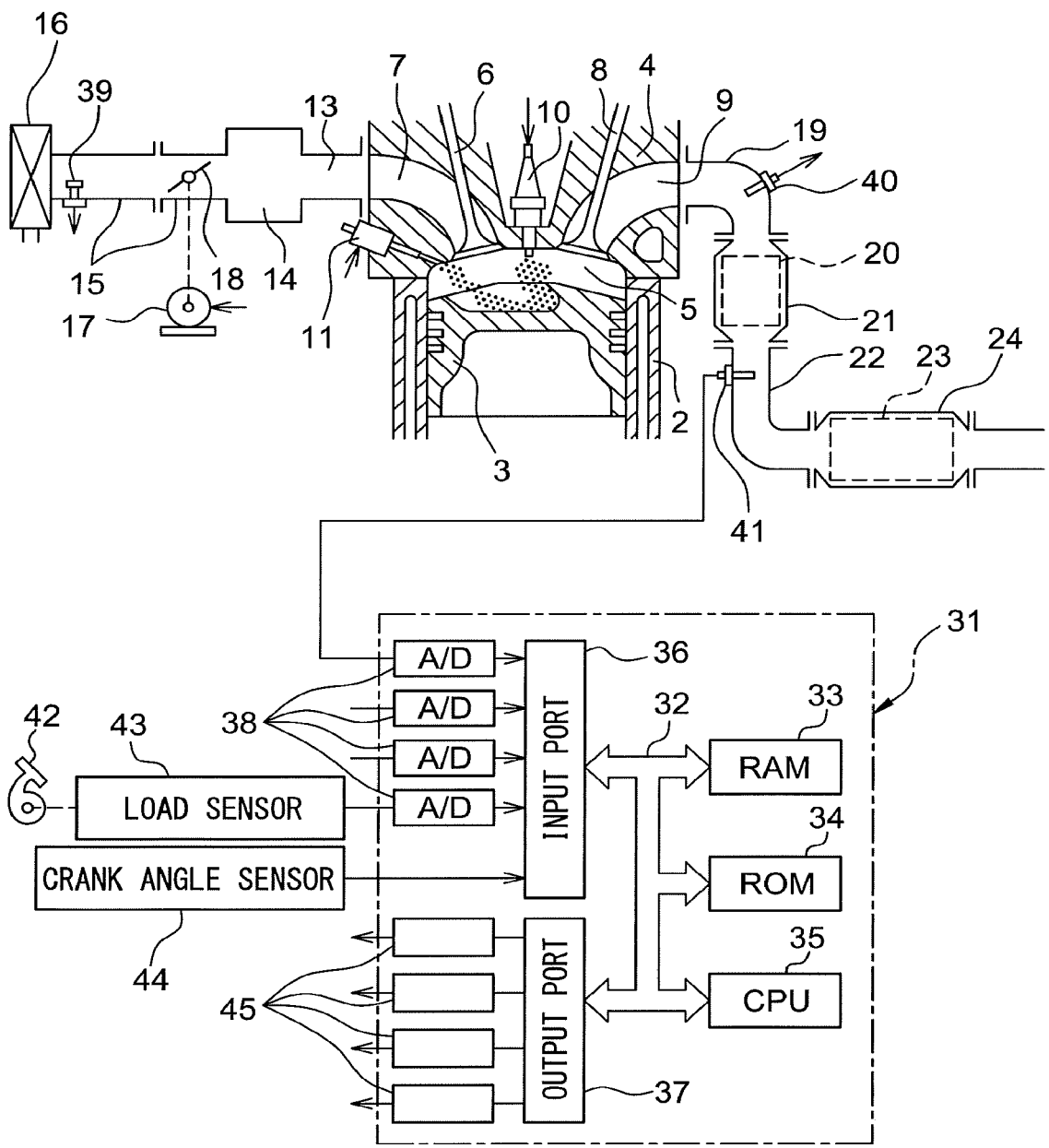
FIG. 1 is a view schematically showing an internal combustion engine in which a catalyst deterioration detection system according to a first embodiment of the present invention is provided.

Below, referring to the figures, embodiments of the present invention will be explained in detail. Note that, in the following explanation, similar components are assigned the same reference numerals.

First Embodiment

First, referring to FIG. 1 to FIG. 15, a first embodiment of the present invention will be explained.

Explanation of Internal Combustion Engine Overall

FIG. 1 is a view schematically showing an internal combustion engine provided with a catalyst deterioration detection system according to a first embodiment of the present invention. The internal combustion engine shown in FIG. 1 is a spark ignition type internal combustion engine. The internal combustion engine is mounted in a vehicle.

Referring to FIG. 1, 2 indicates a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

Various control routines of the internal combustion engine are performed by an electronic control unit (ECU) 31 based on outputs of sensors provided in the internal combustion engine, etc. The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 detecting the flow rate of air which flows through the intake pipe 15 is arranged. The output of the air flow meter 39 is input through a corresponding AD converter 38 to the input port 36.

Further, at the header of the exhaust manifold 19, i.e., a upstream side of the upstream side catalyst 20 in the direction of flow of exhaust, an upstream side air-fuel ratio sensor 40 detecting the air-fuel ratio of the exhaust gas which flows through the inside of the exhaust manifold 19 (that is, the exhaust gas which flows into the upstream side catalyst 20) is arranged. The output of the upstream air-fuel ratio sensor 40 is input through the corresponding AD converter 38 to the input port 36.

Further, inside the exhaust pipe 22, that is, at the downstream side of the upstream side catalyst 20 in the direction of flow of exhaust, a downstream side air-fuel ratio sensor 41 for detecting an air-fuel ratio of the exhaust gas flowing through the inside of the exhaust pipe 22 (that is, exhaust gas flowing out from the upstream side catalyst 20) is arranged. The output of the downstream side air-fuel ratio sensor 41 is input through a corresponding AD converter 38 to the input port 36.

Further, an accelerator pedal 42 is connected to a load sensor 43 generating an output voltage proportional to the amount of depression of the accelerator pedal 42. The output voltage of the load sensor 43 is input through a corresponding AD converter 38 to the input port 36. A crank angle sensor 44 generates an output pulse every time the crankshaft rotates, for example, by 15 degrees. This output pulse is input to the input port 36. In the CPU 35, the engine speed is calculated from the output pulse of the crank angle sensor 44. On the other hand, the output port 37 is connected through corresponding drive circuits 45 to the spark plugs 10, fuel injectors 11, and the throttle valve drive actuator 17.

Note that, the above-mentioned internal combustion engine is a nonsupercharged internal combustion engine fueled by gasoline, but the configuration of the internal combustion engine is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine may differ from the configuration shown in FIG. 1. For example, the fuel injectors 11 may be arranged to inject fuel into the intake ports 7.

Explanation of Catalysts

The upstream side catalyst 20 and the downstream side catalyst 24 arranged in the exhaust passage have similar configurations. The catalysts 20 and 24 are catalysts having oxygen storage abilities, for example, three-way catalysts. Specifically, the catalysts 20 and 24 are comprised of carriers made of ceramic on which a precious metal having a catalytic action (for example, platinum (Pt)) and a co-catalyst having an oxygen storage ability (for example, ceria ($CeO_2$)) are carried.

Figure 2:
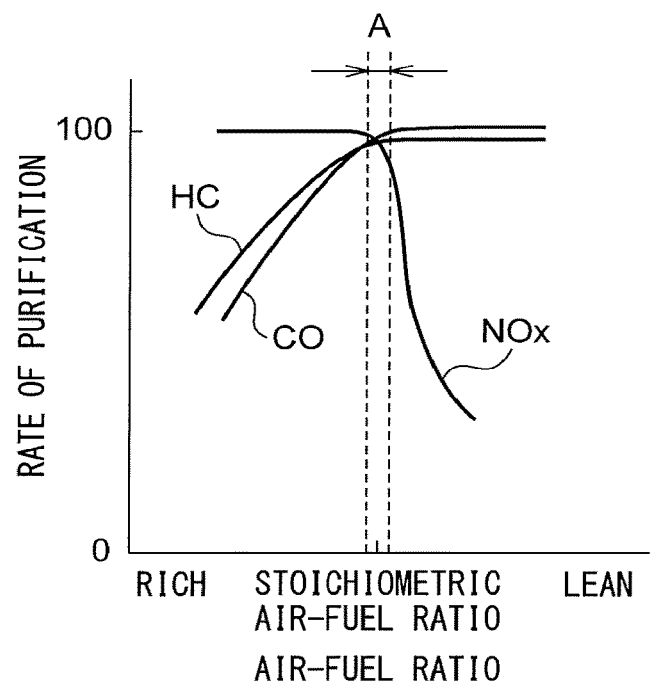
FIG. 2 shows the purification characteristics of a three-way catalyst.

FIG. 2 shows the purification characteristics of a three-way catalyst. As shown in FIG. 2, the purification rates of unburned gas (HC, CO) and nitrogen oxides ($NO_X$) by the catalysts 20 and 24 become extremely high when the air-fuel ratio of the exhaust gas flowing into the catalysts 20 and 24 is in the region near the stoichiometric air-fuel ratio (purification window A in FIG. 2). Therefore, the catalysts 20 and 24 can effectively remove unburned gas and $NO_X$ if the air-fuel ratio of the exhaust gas is maintained at the stoichiometric air-fuel ratio.

Further, the catalysts 20 and 24 store or release oxygen in accordance with the air-fuel ratio of the exhaust gas by the co-catalyst. Specifically, the catalysts 20 and 24 store excess oxygen in the exhaust gas when the air-fuel ratio of the exhaust gas is leaner than the stoichiometric air-fuel ratio. On the other hand, the catalysts 20 and 24 release the amount of additional oxygen required for making the unburned gas oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalysts 20 and 24 is maintained near the stoichiometric air-fuel ratio and the unburned gas and NOx are effectively removed at the catalysts 20 and 24.

Note that, so long as the catalysts 20 and 24 have catalytic actions and oxygen storage abilities, they may be catalysts other than three-way catalysts.

Constitutions of Air-Fuel Ratio Sensors

Figure 3:
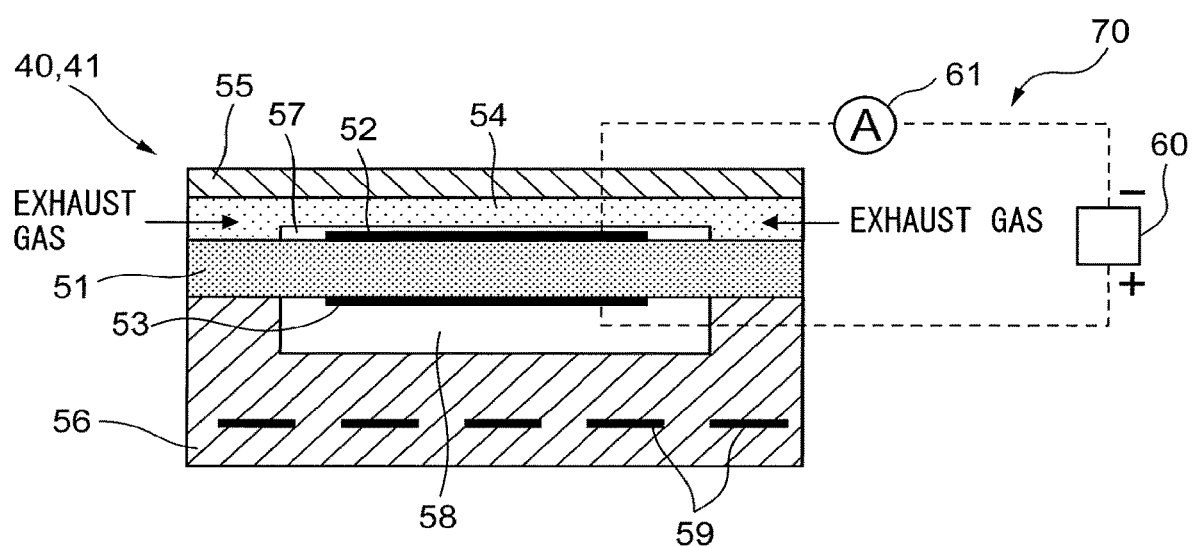
FIG. 3 is a schematic cross-sectional view of an air-fuel ratio sensor.

The upstream side air-fuel ratio sensor 40 and the downstream side air-fuel ratio sensor 41 have similar constitutions. FIG. 3 is a schematic cross-sectional view of the air-fuel ratio sensors 40 and 41. As will be understood from FIG. 3, in the present embodiment, the air-fuel ratio sensors 40 and 41 are one-cell type air-fuel ratio sensors each comprised of a solid electrolyte layer and a pair of electrodes.

As shown in FIG. 3, each of the air-fuel ratio sensors 40 and 41 is provided with a solid electrolyte layer 51, an exhaust side electrode 52 arranged on one side surface of the solid electrolyte layer 51, an atmosphere side electrode 53 arranged on the other side surface of the solid electrolyte layer 51, a diffusion regulating layer 54 for regulating diffusion of the exhaust gas, a protective layer 55 for protecting the diffusion regulating layer 54, and a heater part 56 for heating the air-fuel ratio sensors 40 and 41.

The diffusion regulating layer 54 is provided on one side surface of the solid electrolyte layer 51, while the protective layer 55 is provided on the side surface at the opposite side to the side surface of the solid electrolyte layer 51 side of the diffusion regulating layer 54. In the present embodiment, a measured gas chamber 57 is formed between the solid electrolyte layer 51 and the diffusion regulating layer 54. A part of the exhaust gas flowing through the exhaust passage is introduced through the diffusion regulating layer 54 to the measured gas chamber 57. Further, the exhaust side electrode 52 is arranged inside the measured gas chamber 57. Therefore, the exhaust side electrode 52 is exposed to the exhaust gas through the diffusion regulating layer 54. Note that, the measured gas chamber 57 does not necessarily have to be provided. Each of the air-fuel ratio sensors 40 and 41 may be configured so that the diffusion regulating layer 54 directly contacts the surface of the exhaust side electrode 52.

The heater part 56 is provided on the other side surface of the solid electrolyte layer 51. A reference gas chamber 58 is formed between the solid electrolyte layer 51 and the heater part 56. Reference gas is introduced inside the reference gas chamber 58. In the present embodiment, the reference gas chamber 58 is open to the atmosphere, so the atmosphere is introduced into the reference gas chamber 58 as the reference gas. The atmosphere side electrode 53 is arranged inside the reference gas chamber 58. Therefore, the atmosphere side electrode 53 is exposed to the reference gas (atmosphere).

The heater part 56 is provided with a plurality of heaters 59. Due to the heaters 59, it is possible to control the temperature of each of the air-fuel ratio sensors 40 and 41, in particular the temperature of the solid electrolyte layer 51. The heater part 56 has a heat generating capacity sufficient for heating the solid electrolyte layer 51 until activation.

The solid electrolyte layer 51 is a thin sheet member having oxide ion conductivity. The solid electrolyte layer 51 is, for example, a sintered body comprised of $ZrO_2$ (zirconia), $HfO_2$, $ThO_2$, $Bi_2O_3$, etc., to which $CaO$, $MgO$, $Y_2O_3$, $Yb_2O_3$, etc., is added as a stabilizer. Further, the diffusion regulating layer 54 is formed by a porous sintered body of alumina, magnesia, silica, spinel, mullite, or other heat resistant inorganic substance. Furthermore, the exhaust side electrode 52 and the atmosphere side electrode 53 are formed by platinum or another precious metal having a high catalytic activity.

Further, an electrical circuit 70 is connected to the exhaust side electrode 52 and the atmosphere side electrode 53. The electrical circuit 70 includes a voltage application device 60 and a current detection device 61. The voltage application device 60 applies voltage to each of the air-fuel ratio sensors 40 and 41 so that the potential of the atmosphere side electrode 53 becomes higher than the potential of the exhaust side electrode 52. Therefore, the exhaust side electrode 52 functions as a negative electrode, while the atmosphere side electrode 53 functions as a positive electrode. The output port 37 of the ECU 31 is connected through a corresponding drive circuit 45 to the voltage application device 60. Therefore, the ECU 31 can control the voltage applied to each of the air-fuel ratio sensors 40 and 41 through the voltage application device 60.

Further, the current detection device 61 detects the current flowing between the exhaust side electrode 52 and the atmosphere side electrode 53, that is, the output current of each of the air-fuel ratio sensors 40 and 41. The output of the current detection device 61 is input through the corresponding AD converter 38 to the input port 36 of the ECU 31. Therefore, the ECU 31 can acquire the output current of each of the air-fuel ratio sensors 40 and 41 detected by the current detection device 61 from the current detection device 61.

Operation of Air-Fuel Ratio Sensors

Figure 4A:
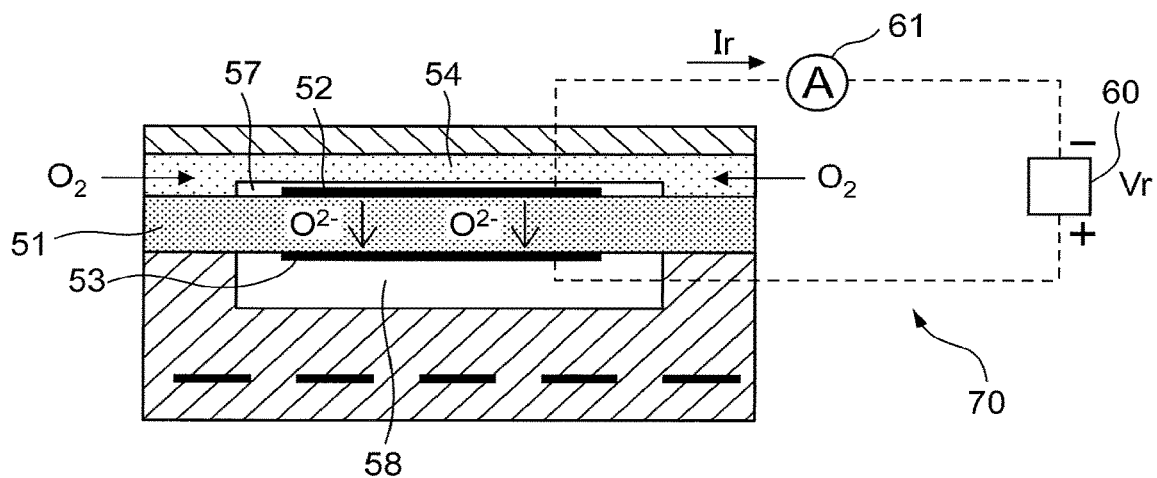
FIG. 4A is a view schematically showing an operation of an air-fuel ratio sensor.
Figure 4B:
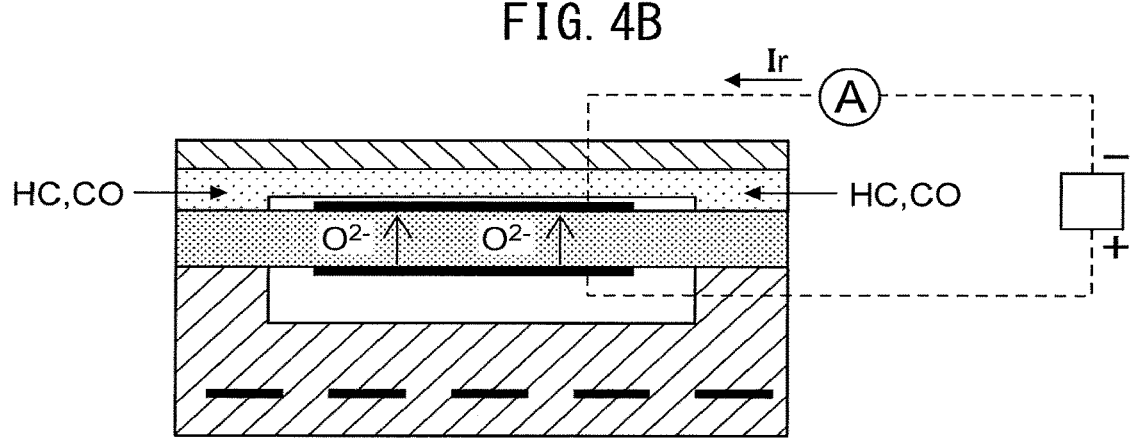
FIG. 4B is a view schematically showing an operation of an air-fuel ratio sensor.
Figure 4C:
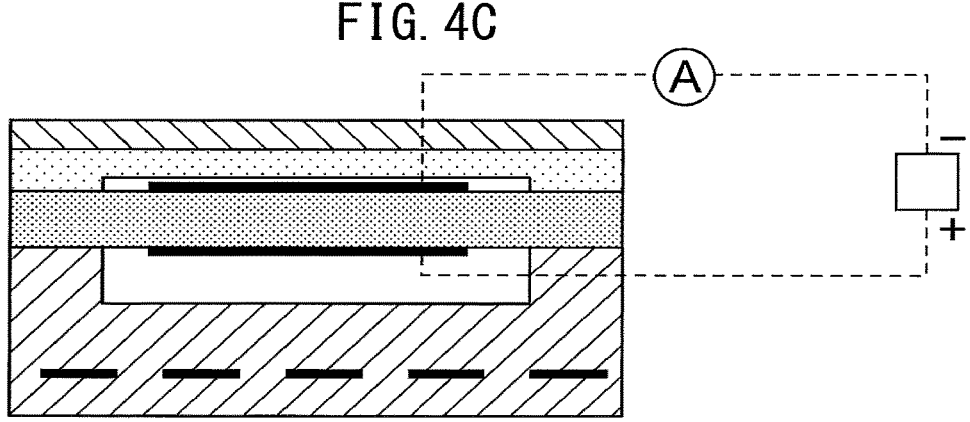
FIG. 4C is a view schematically showing an operation of an air-fuel ratio sensor.

Next, referring to FIGS. 4A to 4C, the basic operation of the air-fuel ratio sensors 40 and 41 will be explained. FIGS. 4A to 4C are views schematically showing the operation of the air-fuel ratio sensors 40 and 41. The air-fuel ratio sensors 40 and 41 are arranged in the exhaust passage so that the outer circumferential surfaces of the protective layers 55 and the diffusion regulating layers 54 are exposed to the exhaust gas. Further, the atmosphere is introduced to the reference gas chambers 58 of the air-fuel ratio sensors 40 and 41.

As explained above, each solid electrolyte layer 51 has oxide ion conductivity. For this reason, if a difference arises in the concentrations of oxygen between the both side surfaces of the activated solid electrolyte layer 51, an electromotive force E is generated trying to make the oxide ions move from the high concentration surface side to the low concentration surface side. This characteristic is called the "oxygen cell characteristic".

On the other hand, if a potential difference is given between the both side surfaces of the solid electrolyte layer 51, oxide ions move so that a ratio of oxygen concentration corresponding to the potential difference occurs between the both side surfaces of the solid electrolyte layer. This characteristic is called the "oxygen pumping characteristic".

When the air-fuel ratio of the exhaust gas flowing into each of the air-fuel ratio sensors 40 and 41 is leaner than the stoichiometric air-fuel ratio, since the oxygen concentration in the exhaust gas is high, the ratio of the oxygen concentration between the both side surfaces of the solid electrolyte layer 51 is not so large. For this reason, if setting the voltage Vr applied to each of the air-fuel ratio sensors 40 and 41 to a suitable value, the ratio of the oxygen concentration between the both side surfaces of the solid electrolyte layer 51 becomes smaller than the ratio of oxygen concentration corresponding to the sensor applied voltage Vr. For this reason, to enable the ratio of the oxygen concentration between the both side surfaces of the solid electrolyte layer 51 to become close to the ratio of oxygen concentration corresponding to the sensor applied voltage Vr, as shown in FIG. 4A, oxide ions move from the exhaust side electrode 52 to the atmosphere side electrode 53. As a result, a current Ir flows from the positive electrode of the voltage application device 60 to the negative electrode of the voltage application device 60. At this time, a positive current is detected by the current detection device 61. Further, the value of the current Ir becomes larger the higher the oxygen concentration in the exhaust gas flowing into the measured gas chamber 57, that is, the higher the air-fuel ratio of the exhaust gas.

On the other hand, when the air-fuel ratio of the exhaust gas flowing into each of the air-fuel ratio sensors 40 and 41 is richer than the stoichiometric air-fuel ratio, the oxygen on the exhaust side electrode 52 reacts with the unburned gases in the exhaust gas and is removed. For this reason, the oxygen concentration at the exhaust side electrode 52 becomes extremely low and the ratio of oxygen concentration between the both side surfaces of the solid electrolyte layer 51 becomes larger. For this reason, if setting the sensor applied voltage Vr to a suitable value, the ratio of the oxygen concentration between the both side surfaces of the solid electrolyte layer 51 becomes larger than the ratio of the oxygen concentration corresponding to the sensor applied voltage Vr. For this reason, as shown in FIG. 4B, oxide ions move from the atmosphere side electrode 53 to the exhaust side electrode 52 so that the ratio of the oxygen concentration between the both side surfaces of the solid electrolyte layer 51 approaches the ratio of the oxygen concentration corresponding to the sensor applied voltage Vr. As a result, current Ir flows from the negative electrode of the voltage application device 60 to the positive electrode of the voltage application device 60. At this time, a negative current is detected by the current detection device 61. Further, the absolute value of the current Ir becomes larger the higher the concentration of unburned gases in the exhaust gas flowing into the measured gas chamber 57, that is, the lower the air-fuel ratio of the exhaust gas.

Further, when the air-fuel ratio of the exhaust gas flowing into each of the air-fuel ratio sensors 40 and 41 is the stoichiometric air-fuel ratio, the amounts of oxygen and unburned gases in the exhaust gas become the chemical equivalent ratios. For this reason, due to the catalytic action of the exhaust side electrode 52, the two completely burn and the ratio of the oxygen concentration between the both side surfaces of the solid electrolyte layer 51 is maintained at the oxygen concentration ratio corresponding to the applied voltage Vr. For this reason, as shown in FIG. 4C, no movement of oxide ions occurs due to the oxygen pumping characteristic and the current detected by the current detection device 61 becomes zero.

Therefore, the values of the output currents of the air-fuel ratio sensors 40 and 41 fluctuate according to the air-fuel ratio of the exhaust gas flowing into the air-fuel ratio sensors 40 and 41. For this reason, the ECU 31 can estimate the air-fuel ratio of the exhaust gas based on the currents detected by the current detection device 61. Note that, "the air-fuel ratio of the exhaust gas" means the ratio of the mass of the air to the mass of the fuel supplied until the exhaust gas is generated (mass of air/mass of fuel) and is estimated from the constituents of the exhaust gas.

Specific Example of Electrical Circuits

Figure 5:
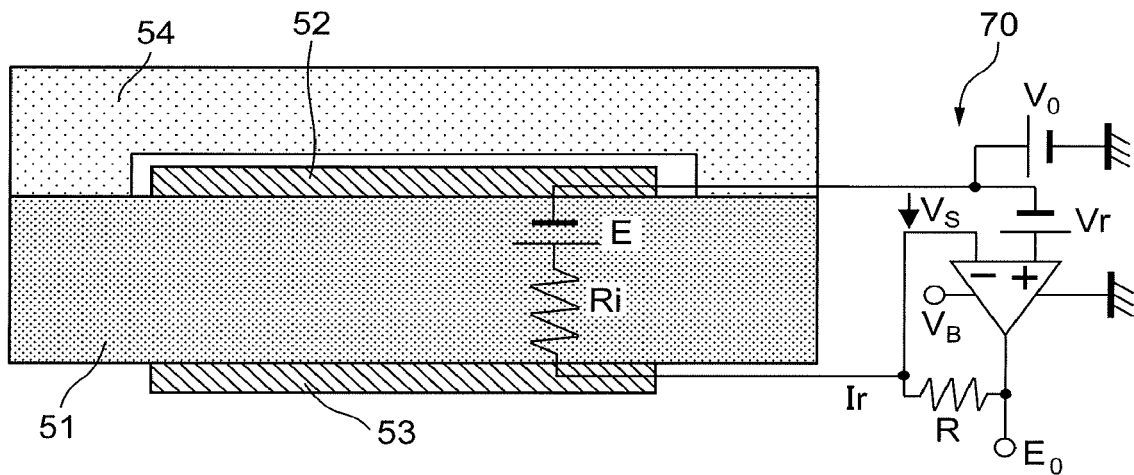
FIG. 5 shows a specific example of an electrical circuit.

FIG. 5 shows a specific example of the electrical circuits 70. In the illustrated example, the electromotive force generated by the oxygen cell characteristic is designated by "E", the internal resistance of the solid electrolyte layer 51 by "Ri", the potential difference between the electrodes 52 and 53 by "Vs", and the sensor applied voltage applied by the voltage application device 60 to the air-fuel ratio sensors 40 and 41 by "Vr".

As will be understood from FIG. 5, the voltage application device 60 basically performs negative feedback control so that the electromotive force F generated by the oxygen cell characteristic matches with the sensor applied voltage Vr. The voltage application device 60 performs negative feedback control so that the potential difference Vs becomes the sensor applied voltage Vr even when a change in the ratio of oxygen concentration between the both side surfaces of the solid electrolyte layers 51 causes a change in the potential difference Vs between two electrodes 52 and 53.

If the air-fuel ratio of the exhaust gas is the stoichiometric air-fuel ratio and the ratio of the oxygen concentration between the both side surfaces of a solid electrolyte layer 51 does not change, the ratio of the oxygen concentration between the both side surfaces of the solid electrolyte layer 51 becomes a ratio of oxygen concentration corresponding to the sensor applied voltage Vr. In this case, the electromotive force E and the potential difference Vs match the sensor applied voltage Vr, so the current Ir does not flow.

On the other hand, if the air-fuel ratio of the exhaust gas is an air-fuel ratio different from the stoichiometric air-fuel ratio and the ratio of the oxygen concentration between the both side surfaces of a solid electrolyte layer 51 changes, the ratio of the oxygen concentration between the both side surfaces of the solid electrolyte layer 51 differs from the oxygen concentration ratio corresponding to the sensor applied voltage Vr. In this case, the electromotive force E becomes a value different from the sensor applied voltage Vr. As a result, due to negative feedback control, a potential difference Vs is given to the electrodes 52 and 53 so as to make the oxide ions move between the both side surfaces of the solid electrolyte layer 51 so that the electromotive force E matches the sensor applied voltage Vr. Further, current Ir flows along with movement of oxide ions. As a result, the electromotive force E converges at the sensor applied voltage Vr, while the potential difference Vs also converge at the sensor applied voltage Vr.

Further, the current detection device 61 detects the voltage $E_0$ for detecting the current Ir. Here, $E_0$ is expressed like in the following formula (1):

$$E_0 = Vr + V_0 + IrR \quad (1)$$

Here, $V_0$ is the offset voltage (for example, 3V) applied so that $E_0$ does not become a negative value, while R is the value of the resistance shown in FIG. 5.

In formula (1), the sensor applied voltage Vr, the offset voltage $V_0$, and the resistance value R are constant, so the voltage $E_0$ changes in accordance with the current Ir. Therefore, the current detection device 61 can calculate the current Ir based on the voltage $E_0$.

Note that, the electrical circuits 70 may be different from the configuration shown in FIG. 5 so long as able to apply voltage to the air-fuel ratio sensors 40 and 41 and to detect the output currents of the air-fuel ratio sensors 40 and 41.

Output Characteristics of Air-Fuel Ratio Sensors

Figure 6:
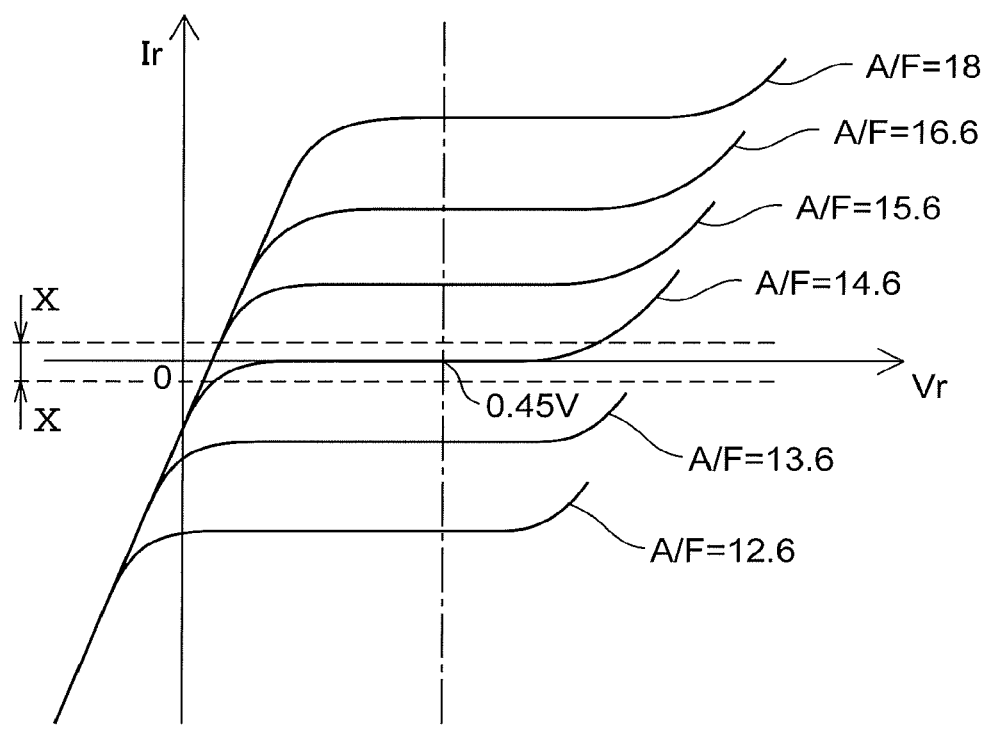
FIG. 6 is a view showing a voltage-current characteristic of an air-fuel ratio sensor.

As a result of the above-mentioned principle, each of the air-fuel ratio sensors 40 and 41 has a voltage-current (V-I) characteristic such as shown in FIG. 6. As shown in FIG. 6, in the region of the sensor applied voltage Vr of 0 or less and near 0, if the exhaust air-fuel ratio is constant, the output current Ir becomes larger as the sensor applied voltage Vr rises. Note that, the voltage region where the output current Ir changes proportionally to the sensor applied voltage Vr will be referred to as the "proportional region".

In the proportional region, the sensor applied voltage Vr is low, so the flow rate of oxide ions able to move through the solid electrolyte layer 51 is small. In this case, the speed of movement of oxide ions moving through the solid electrolyte layer 51 along with the application of voltage becomes slower than the speed of introduction of the exhaust gas introduced into the measured gas chamber 57 through the diffusion regulating layer 54. For this reason, the flow rate of the oxide ions able to move through the solid electrolyte layer 51 changes according to the sensor applied voltage Vr and the output current Ir increases along with the increase of the sensor applied voltage Vr. Note that, the output current Ir becomes a negative value when the sensor applied voltage Vr is 0 because an electromotive force corresponding to the ratio of the oxygen concentration between the both side surfaces of the solid electrolyte layer 51 is generated due to the oxygen cell characteristic.

As shown in FIG. 6, if the sensor applied voltage Vr becomes a predetermined value or more, the output current Ir is maintained at a substantially constant value regardless of the value of the sensor applied voltage Vr. This saturated current is called the "limit current", while the voltage region where the limit current is generated is called the "limit current region". In the limit current region, the sensor applied voltage Vr is higher than the proportional region, so the flow rate of oxide ions able to move through the solid electrolyte layer 51 becomes greater than the proportional region. In this case, the speed of movement of the oxide ions moving through the solid electrolyte layer 51 along with application of voltage becomes faster than the speed of introduction of exhaust gas introduced to the measured gas chamber 57 through the diffusion regulating layer 54. For this reason, the flow rate of the oxide ions able to move through the solid electrolyte layer 51 does not change much at all in accordance with the sensor applied voltage Vr, so the output current Ir is maintained at a substantially constant value regardless of the value of the sensor applied voltage Vr. On the other hand, the flow rate of the oxide ions able to move through the solid electrolyte layer 51 changes in accordance with the ratio of the oxygen concentration between the both side surfaces of the solid electrolyte layer 51, so the output current Ir changes in accordance with the air-fuel ratio of the exhaust gas.

As shown in FIG. 6, in the region where the sensor applied voltage Vr is extremely high, if the exhaust air-fuel ratio is constant, the output current Ir becomes larger the higher the sensor applied voltage Vr. If the sensor applied voltage Vr becomes extremely high, at the exhaust side electrode 52, the water in the exhaust gas is decomposed. The oxide ions produced by decomposition of water move through the inside of the solid electrolyte layer 51 from the exhaust side electrode 52 to the atmosphere side electrode 53. As a result, the current resulting from the decomposition of water is also detected as the output current Ir, so the output current Ir becomes larger than the limit current. This voltage region will be called the "water decomposition region".

Figure 7:
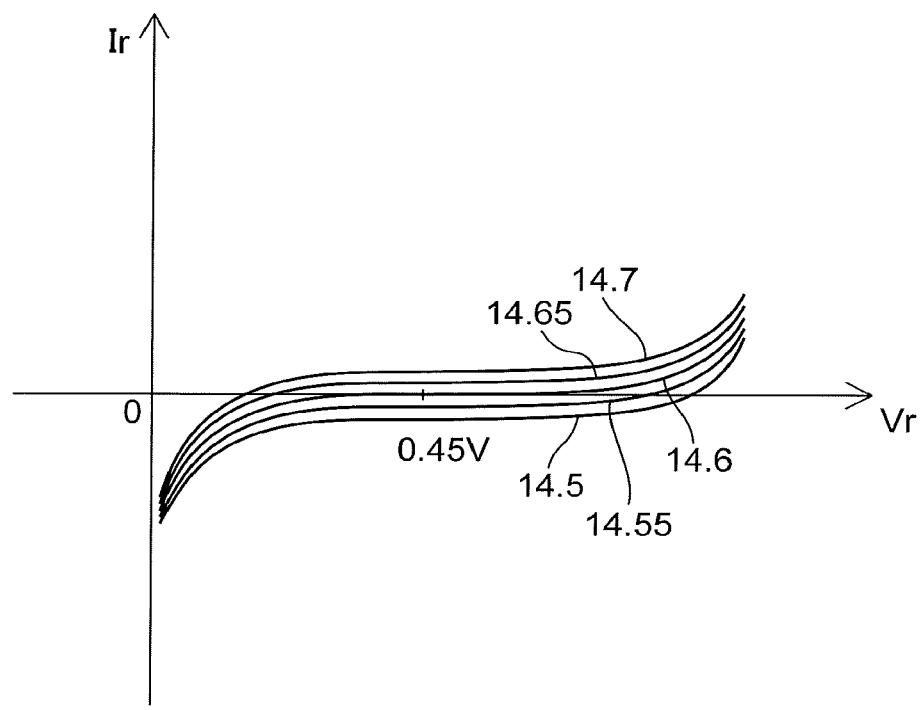
FIG. 7 is a view showing a voltage-current characteristic in an X-X region of FIG. 6.

FIG. 7 is a view showing the voltage-current characteristic in the X-X region of FIG. 6. As will be understood from FIG. 7, even in the limit current region, when the air-fuel ratio of the exhaust gas is constant, the output current Ir becomes slightly larger as the sensor applied voltage Vr rises. For this reason, the value of the sensor applied voltage Vr when the output current Ir becomes zero changes according to the air-fuel ratio of the exhaust gas.

For example, if the air-fuel ratio of the exhaust gas is the stoichiometric air-fuel ratio (14.6), the value of the sensor applied voltage Vr when the output current Ir becomes zero is 0.45V. If the air-fuel ratio of the exhaust gas is lower than the stoichiometric air-fuel ratio (is rich), the value of the sensor applied voltage Vr when the output current Ir becomes zero is higher than 0.45V. On the other hand, if the air-fuel ratio of the exhaust gas is higher than the stoichiometric air-fuel ratio (is lean), the value of the sensor applied voltage Vr when the output current Ir becomes zero is lower than 0.45V.

Figure 8:
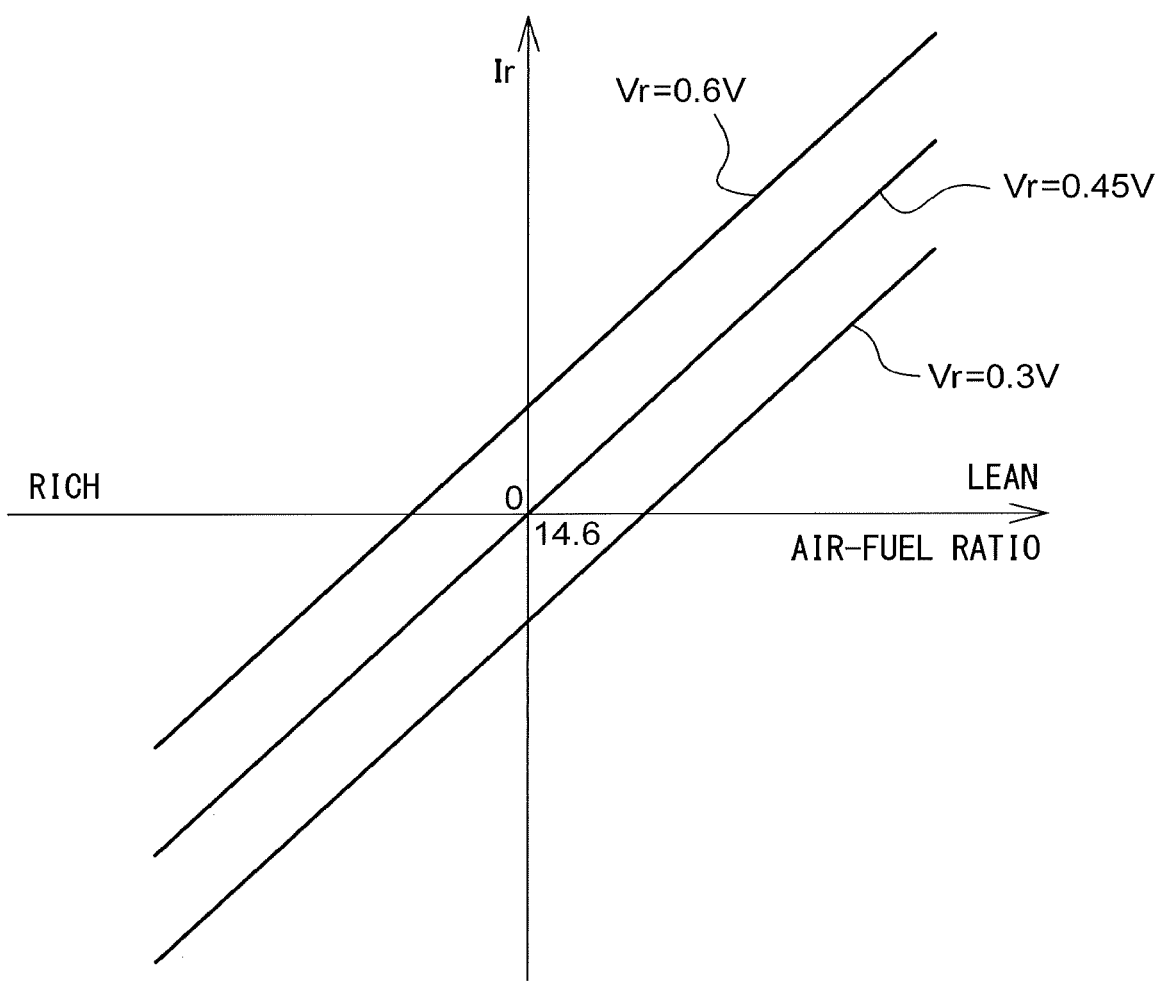
FIG. 8 is a graph showing a relationship between an air-fuel ratio of the exhaust gas and output current.
Figure 9:
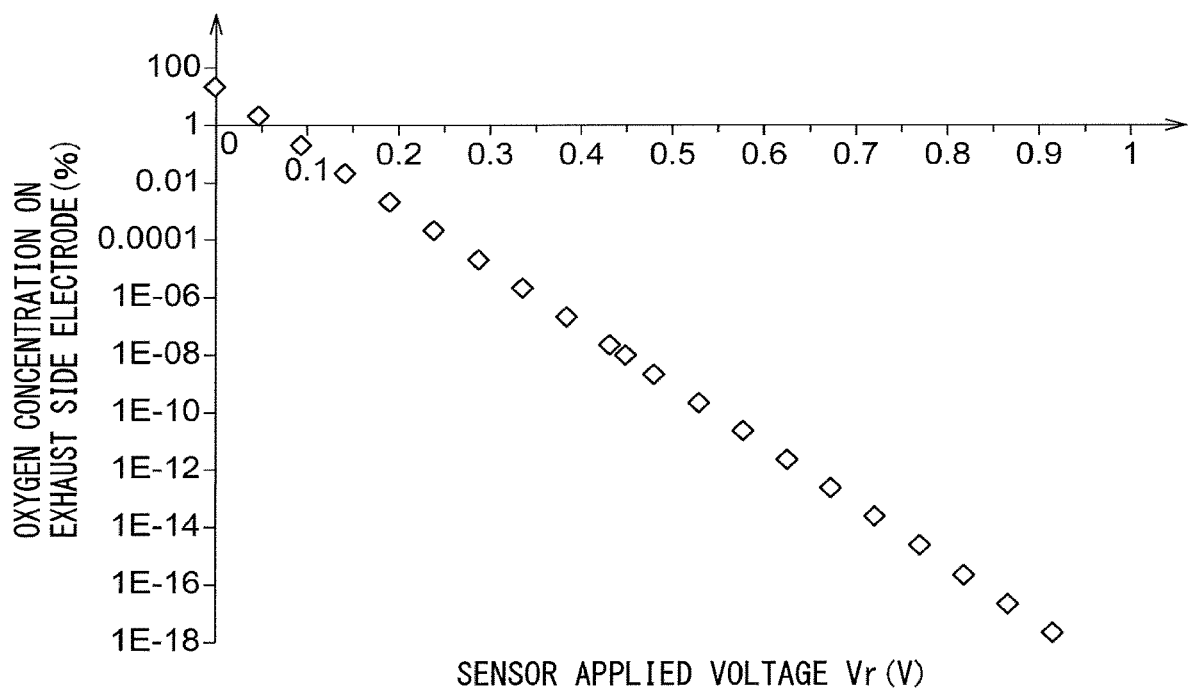
FIG. 9 is a graph showing a relationship between a sensor applied voltage and an oxygen concentration on an exhaust side electrode when an output current is zero.

FIG. 8 is a graph showing the relationship between an air-fuel ratio of the exhaust gas and the output current Ir. In FIG. 8, the region near the stoichiometric air-fuel ratio is enlarged. FIG. 8 shows the relationship between the air-fuel ratio of the exhaust gas and the output current Ir when the sensor applied voltage Vr is 0.3V, 0.45V, and 0.6V. FIG. 9 is a graph showing the relationship between the sensor applied voltage Vr and the oxygen concentration on the exhaust side electrode when the output current is zero. In FIG. 9, the y-axis (oxygen concentration on exhaust side electrode) is shown logarithmically. The richer the air-fuel ratio of the exhaust gas, the lower the oxygen concentration on the exhaust side electrode. As will be understood from FIG. 8 and FIG. 9, as the sensor applied voltage Vr becomes higher, the air-fuel ratio of the exhaust gas when the output current Ir becomes zero becomes lower (becomes richer).

Catalyst Deterioration Detection System

Figure 10:
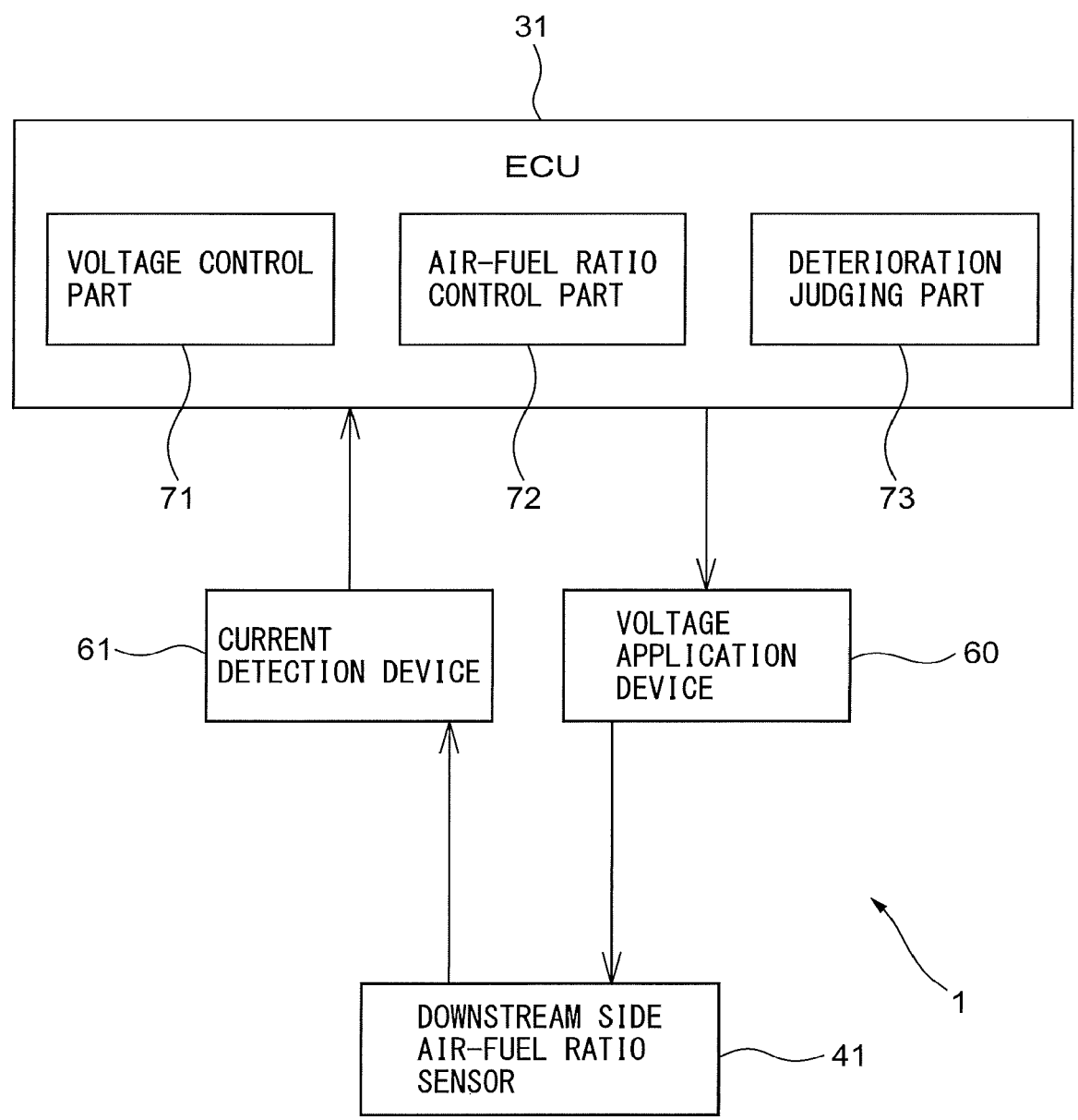
FIG. 10 is a block diagram showing a catalyst deterioration detection system according to a first embodiment of the present invention.

Below, a catalyst deterioration detection system according to a first embodiment of the present invention will be explained. FIG. 10 is a block diagram showing the catalyst deterioration detection system according to the first embodiment of the present invention. The catalyst deterioration detection system 1 detects deterioration of the upstream side catalyst 20. The catalyst deterioration detection system 1 is provided with the downstream side air-fuel ratio sensor 41, current detection device 61, voltage application device 60, voltage control part 71, air-fuel ratio control part 72, and deterioration judging part 73. In the present embodiment, the ECU 31 functions as the voltage control part 71, air-fuel ratio control part 72, and deterioration judging part 73.

The voltage control part 71 controls the voltage applied to the downstream side air-fuel ratio sensor 41 through the voltage application device 60. As shown in FIG. 8, if the voltage applied to the downstream side air-fuel ratio sensor 41 changes, the relationship between the air-fuel ratio of the exhaust flowing out from the upstream side catalyst 20 (below, referred to as the "outflowing exhaust gas") and the output current of the downstream side air-fuel ratio sensor 41 changes.

The air-fuel ratio control part 72 controls the air-fuel ratio of the exhaust gas flowing into the upstream side catalyst 20 (below, referred to as the "inflowing exhaust gas"). Specifically, the air-fuel ratio control part 72 changes the amount of fuel supplied from the fuel injectors 11 to the combustion chambers 5 to thereby control the air-fuel ratio of the inflowing exhaust gas.

In the present embodiment, the air-fuel ratio control part 72 performs fuel cut control where the supply of fuel to the combustion chambers 5 is stopped when a predetermined execution conditions is satisfied. The air-fuel ratio control part 72, in the fuel cut control, stops the injection of fuel from the fuel injectors 11 to thereby stop the supply of fuel to the combustion chambers 5. The predetermined execution condition, for example, is satisfied when the amount of depression of the accelerator pedal 42 is zero or substantially zero (that is, the engine load is zero or substantially zero) and the engine speed is equal to or higher than a predetermined speed higher than the speed at the time of idling or.

If fuel cut control is performed, air or a gas similar to air is discharged into the exhaust passage and flows into the upstream side catalyst 20. As a result, a large amount of oxygen flows into the upstream side catalyst 20 and the oxygen storage amount of the upstream side catalyst 20 reaches the maximum oxygen storage amount. Further, if the oxygen storage amount of the upstream side catalyst 20 reaches the maximum oxygen storage amount, a large amount of oxygen also flows into the downstream side catalyst 24 and the oxygen storage amount of the downstream side catalyst 24 reaches the maximum oxygen storage amount.

For this reason, if fuel cut control is continued for a predetermined time or more, the oxygen storage amounts of the upstream side catalyst 20 and the downstream side catalyst 24 become maximum. When the oxygen storage amounts of the upstream side catalyst 20 and the downstream side catalyst 24 are the maximum oxygen storage amounts, the upstream side catalyst 20 and the downstream side catalyst 24 can no longer store excessive oxygen in the exhaust gas. For this reason, if, after fuel cut control, exhaust gas leaner than the stoichiometric air-fuel ratio flows into the upstream side catalyst 20 and the downstream side catalyst 24, in the upstream side catalyst 20 and the downstream side catalyst 24, the $NO_X$ in the exhaust gas is liable to not be purified and the exhaust emission is liable to deteriorate.

Therefore, in the present embodiment, after fuel cut control, the air-fuel ratio control part 72 performs rich control making the air-fuel ratio of the inflowing exhaust gas richer than the stoichiometric air-fuel ratio. By doing this, it is possible to reduce the oxygen storage amounts of the upstream side catalyst 20 and the downstream side catalyst 24 and keep the exhaust emission from deteriorating after fuel cut control.

The air-fuel ratio control part 72, in rich control, sets the target air-fuel ratio of the inflowing exhaust gas to a rich set air-fuel ratio richer than the stoichiometric air-fuel ratio and performs feedback control on the amount of fuel supplied to the combustion chambers 5 so that the output air-fuel ratio of the upstream side air-fuel ratio sensor 40 matches the rich set air-fuel ratio. Note that, the "output air-fuel ratio" is the air-fuel ratio detected by the air-fuel ratio sensor and means the air-fuel ratio corresponding to the output current of the air-fuel ratio sensor.

Note that, the air-fuel ratio control part 72 may control the amounts of fuel supplied to the combustion chambers 5 so that the air-fuel ratio of the inflowing exhaust gas matches with the rich set air-fuel ratio without using the upstream side air-fuel ratio sensor 40. In this case, the air-fuel ratio control part 72 supplies the combustion chambers 5 with amounts of fuel calculated from the amount of intake air detected by the air flow meter 39 and the rich set air-fuel ratio so that the ratio of the fuel and the air supplied to the combustion chambers 5 match the rich set air-fuel ratio.

Further, the air-fuel ratio control part 72 ends the rich control when judging that the total of the intake air amount from when starting rich control reaches a predetermined amount. The predetermined amount is made greater than the amount required for the oxygen storage amount of the upstream side catalyst 20 to decrease from the maximum oxygen storage amount down to zero. Note that, the air-fuel ratio control part 72 may also end the rich control when the output air-fuel ratio of the downstream side air-fuel ratio sensor 41 reaches a rich judged air-fuel ratio richer than the stoichiometric air-fuel ratio.

Detection of Deterioration of Catalyst

The deterioration judging part 73 judges the degree of deterioration of the upstream side catalyst 20. The inventors of the present application engaged in intensive studies and as a result discovered that it is possible to judge the degree of deterioration of the upstream side catalyst 20 during rich control after fuel cut control based on the following discovery.

The upstream side catalyst 20 deteriorates due to long term use etc. If the upstream side catalyst 20 deteriorates, the maximum oxygen storage amount of the upstream side catalyst 20 will become smaller. Further, if the upstream side catalyst 20 deteriorates, the exhaust purification performance of the upstream side catalyst 20 will fall. As a result, the purification window will become narrower and even if the air-fuel ratio on the surface of the upstream side catalyst 20 is made near the stoichiometric air-fuel ratio due to the storage or release of oxygen, sometimes a fine amount of unburned gas or $NO_X$ will flow out from the upstream side catalyst 20. The fluctuation of the air-fuel ratio of the outflowing exhaust gas when the air-fuel ratio on the surface of the upstream side catalyst 20 is made near the stoichiometric air-fuel ratio presumably becomes greater the larger the degree of deterioration of the upstream side catalyst 20.

Normally, if rich control is performed after fuel cut control, along with the decrease in the oxygen storage amount of the upstream side catalyst 20, the output air-fuel ratio of the downstream side air-fuel ratio sensor 41 will converge at the stoichiometric air-fuel ratio from a value leaner than the stoichiometric air-fuel ratio then will change to a value richer than the stoichiometric air-fuel ratio. If the degree of deterioration of the upstream side catalyst 20 is small, when the air-fuel ratio on the surface of the upstream side catalyst 20 is made near the stoichiometric air-fuel ratio due to the release of oxygen during rich control, the air-fuel ratio of the outflowing exhaust gas will not fluctuate much at all.

On the other hand, if the degree of deterioration of the upstream side catalyst 20 is large, even when the air-fuel ratio on the surface of the upstream side catalyst 20 is made near the stoichiometric air-fuel ratio due to the release of oxygen during rich control, the fluctuation of the air-fuel ratio of the outflowing exhaust gas becomes larger. For this reason, it is possible to judge the degree of deterioration of the upstream side catalyst 20 by detecting fluctuation of the air-fuel ratio of the outflowing exhaust gas when the air-fuel ratio on the surface of the upstream side catalyst 20 is made near the stoichiometric air-fuel ratio.

In the present embodiment, the voltage applied to the downstream side air-fuel ratio sensor 41 is made to change so as to thereby detect the fluctuation in the air-fuel ratio of the outflowing exhaust gas at the time when the air-fuel ratio on the surface of the upstream side catalyst 20 is made near the stoichiometric air-fuel ratio.

Further, if rich control is performed after fuel cut control, even when the degree of deterioration of the upstream side catalyst 20 is large, the air-fuel ratio of the outflowing exhaust gas will reach the stoichiometric air-fuel ratio when the oxygen storage amount of the upstream side catalyst 20 becomes a suitable amount.

For this reason, in the present embodiment, the voltage control part 71, if judging that the air-fuel ratio of the outflowing exhaust gas has reached the stoichiometric air-fuel ratio when setting the voltage applied to the downstream side air-fuel ratio sensor 41 to the first voltage during rich control after fuel cut control, changes the voltage applied to the downstream side air-fuel ratio sensor 41 from the first voltage to the second voltage. Further, the deterioration judging part 73 judges the degree of deterioration of the upstream side catalyst 20 based on the output current of the downstream side air-fuel ratio sensor 41 detected by the current detection device 61 when the voltage applied to the downstream side air-fuel ratio sensor 41 is set to the second voltage (below, referred to as the "second output current").

Note that, the deterioration judging part 73 may judge the degree of deterioration of the upstream side catalyst 20 based on the air-fuel ratio detected by the downstream side air-fuel ratio sensor 41 when the voltage applied to the downstream side air-fuel ratio sensor 41 is set to the second voltage (below, referred to as the "second output air-fuel ratio"). The second output air-fuel ratio is calculated based on the second output current, so in this case as well, the degree of deterioration of the upstream side catalyst 20 can be said to be judged based on the second output current.

The first voltage is determined in advance and is a voltage in the limit current region. For example, the first voltage is set to a voltage of 0.15V to 0.7V. In the limit current region, the output current of the downstream side air-fuel ratio sensor 41 changes in accordance with the air-fuel ratio of the outflowing exhaust gas. For this reason, it is possible to detect the air-fuel ratio of the outflowing exhaust gas based on the output current of the downstream side air-fuel ratio sensor 41 when the voltage applied to the downstream side air-fuel ratio sensor 41 is set to the first voltage. The voltage control part 71 judges that the air-fuel ratio of the outflowing exhaust gas has reached the stoichiometric air-fuel ratio when the output current of the downstream side air-fuel ratio sensor 41 becomes a value corresponding to near the stoichiometric air-fuel ratio (for example, 14.6±0.01), that is, the output air-fuel ratio of the downstream side air-fuel ratio sensor 41 becomes near the stoichiometric air-fuel ratio.

The second voltage is determined in advance and is a voltage in the limit current region different from the first voltage. For example, the second voltage is set to a voltage of 0.15V to 0.7V. As will be understood from FIG. 8, if raising the voltage applied to the downstream side air-fuel ratio sensor 41, the output current of the downstream side air-fuel ratio sensor 41 for the same air-fuel ratio of the outflowing exhaust gas becomes larger. On the other hand, if lowering the voltage applied to the downstream side air-fuel ratio sensor 41, the output current of the downstream side air-fuel ratio sensor 41 for the same air-fuel ratio of the outflowing exhaust gas becomes smaller.

In the case where the degree of deterioration of the upstream side catalyst 20 is small, if the air-fuel ratio on the surface of the upstream side catalyst 20 is made near the stoichiometric air-fuel ratio, the air-fuel ratio of the outflowing exhaust gas becomes substantially the stoichiometric air-fuel ratio. For this reason, if the voltage applied to the downstream side air-fuel ratio sensor 41 is changed to the second voltage, the output current of the downstream side air-fuel ratio sensor 41 changes to a value corresponding to the stoichiometric air-fuel ratio. On the other hand, in the case where the degree of deterioration of the upstream side catalyst 20 is large, even if the air-fuel ratio on the surface of the upstream side catalyst 20 is made near the stoichiometric air-fuel ratio, the air-fuel ratio of the outflowing exhaust gas will fluctuate. For this reason, if the voltage applied to the downstream side air-fuel ratio sensor 41 is changed to the second voltage, the output current of the downstream side air-fuel ratio sensor 41 deviates from the value corresponding to the stoichiometric air-fuel ratio in accordance with the deterioration characteristic of the upstream side catalyst 20.

The characteristic when the upstream side catalyst 20 has deteriorated, that is, the deterioration characteristic of the upstream side catalyst 20, differs depending on the constituents forming the upstream side catalyst 20. Specifically, the upstream side catalyst 20, depending on the constituents forming the upstream side catalyst 20 etc., has a deterioration characteristic where the amount of fluctuation of the rate of purification of unburned gases when the air-fuel ratio on the surface of the upstream side catalyst 20 is made near the stoichiometric air-fuel ratio becomes larger than the amount of fluctuation of the rate of purification of $NO_X$ (below, referred to as the "rich side deterioration characteristic") or a deterioration characteristic where the amount of fluctuation of the rate of purification of $NO_X$ when the air-fuel ratio on the surface of the upstream side catalyst 20 is made near the stoichiometric air-fuel ratio becomes larger than the amount of fluctuation of the rate of purification of unburned gas (below, referred to as the "lean side deterioration characteristic"). Note that, the deterioration characteristic of the upstream side catalyst 20 is found in advance theoretically or experimentally.

If the upstream side catalyst 20 has a rich side deterioration characteristic and the degree of deterioration of the upstream side catalyst 20 is large, if the voltage applied to the downstream side air-fuel ratio sensor 41 is changed to the second voltage, the output current of the downstream side air-fuel ratio sensor 41 becomes smaller than a value corresponding to the stoichiometric air-fuel ratio. That is, the output air-fuel ratio of the downstream side air-fuel ratio sensor 41 becomes richer than the stoichiometric air-fuel ratio. On the other hand, if the upstream side catalyst 20 has a lean side deterioration characteristic and the degree of deterioration of the upstream side catalyst 20 is large, if the voltage applied to the downstream side air-fuel ratio sensor 41 is changed to the second voltage, the output current of the downstream side air-fuel ratio sensor 41 becomes larger than a value corresponding to the stoichiometric air-fuel ratio. That is, the output air-fuel ratio of the downstream side air-fuel ratio sensor 41 becomes leaner than near the stoichiometric air-fuel ratio.

For this reason, the deterioration judging part 73 judges that the degree of deterioration of the upstream side catalyst 20 is larger the smaller the second output current if the upstream side catalyst 20 has a rich side deterioration characteristic. In other words, the deterioration judging part 73 judges that the degree of deterioration of the upstream side catalyst 20 is larger the richer the second output air-fuel ratio if the upstream side catalyst 20 has a rich side deterioration characteristic. On the other hand, the deterioration judging part 73 judges that the degree of deterioration of the upstream side catalyst 20 is larger the larger the second output current if the upstream side catalyst 20 has a lean side deterioration characteristic. In other words, the deterioration judging part 73 judges that the degree of deterioration of the upstream side catalyst 20 is larger the leaner the second output air-fuel ratio if the upstream side catalyst 20 has a lean side deterioration characteristic.

In the present embodiment, the degree of deterioration of the upstream side catalyst 20 is judged during the rich control performed for keeping the exhaust emission from deteriorating after fuel cut control. For this reason, to judge the degree of deterioration of the upstream side catalyst 20, it is not necessary to perform active air-fuel ratio control making the oxygen storage amount of the upstream side catalyst 20 fluctuate between zero and the maximum oxygen storage amount. Therefore, it is possible to keep the exhaust emission from deteriorating while detecting deterioration of the upstream side catalyst 20.

Further, normally, when the vehicle mounting the internal combustion engine is running, the execution condition for fuel cut control will be frequently satisfied and fuel cut control will be frequently performed. For this reason, it is possible to increase the frequency of detection of deterioration of the upstream side catalyst 20 and possible to quickly detect deterioration of the upstream side catalyst 20.

Explanation of Control Using Time Chart

Figure 11:
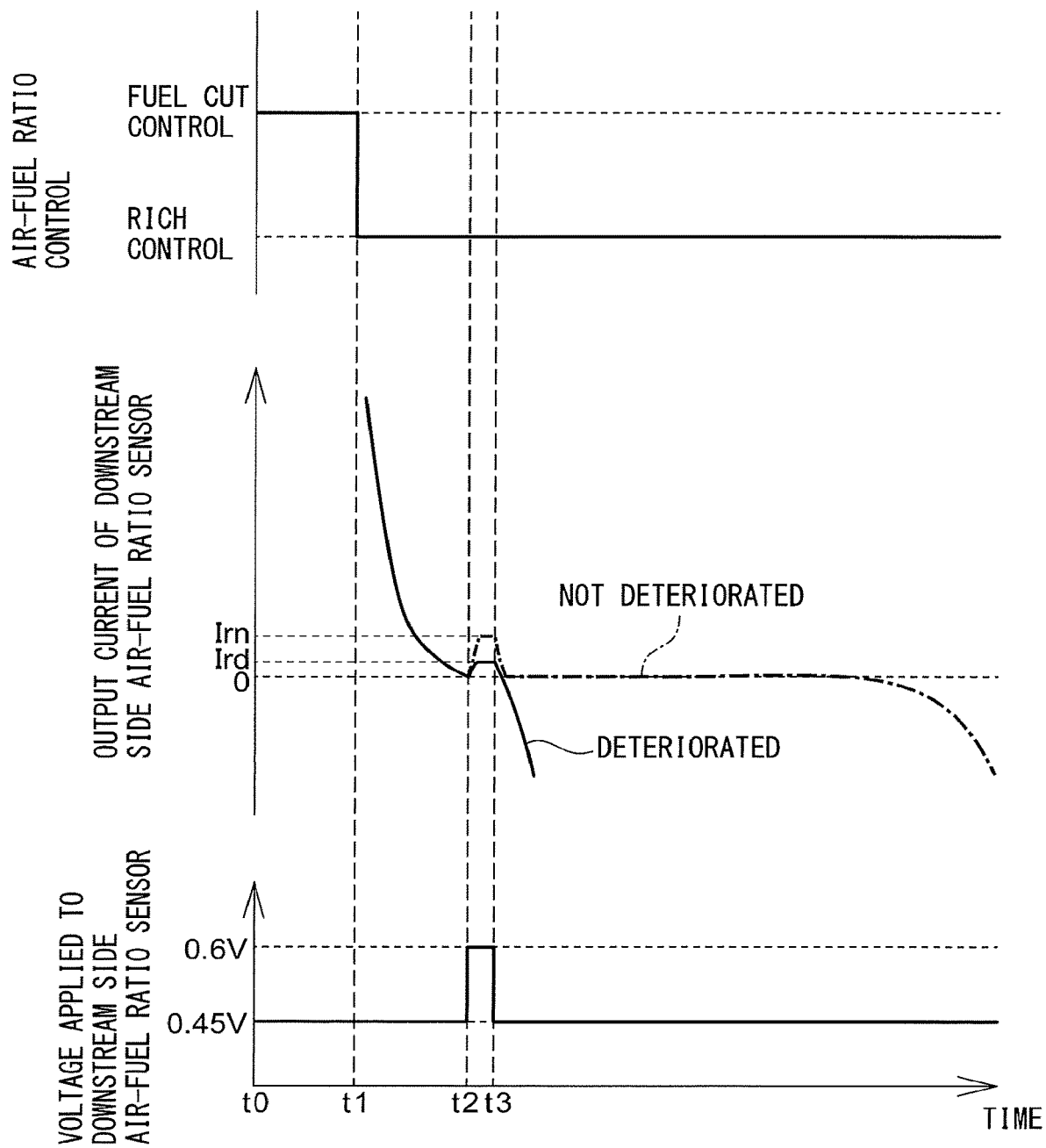
FIG. 11 is a time chart of type of air-fuel ratio control etc., when detecting deterioration of a catalyst.

Below, referring to FIG. 11 and FIG. 12, the detection of deterioration of a catalyst in the present embodiment will be specifically explained. FIG. 11 is a time chart of the type of air-fuel ratio control, the output current of the downstream side air-fuel ratio sensor 41, and the voltage applied to the downstream side air-fuel ratio sensor 41 when detecting deterioration of a catalyst. In the output current of the downstream side air-fuel ratio sensor 41, the solid line shows the data for a deteriorated upstream side catalyst 20, while a one-dot chain line shows the data for a nondeteriorated upstream side catalyst 20. In this example, it is known in advance that the upstream side catalyst 20 has a rich side deterioration characteristic.

In the example of FIG. 11, at the time t0, fuel cut control is performed. Further, the voltage applied to the downstream side air-fuel ratio sensor 41 is set to the first voltage. The voltage applied to the downstream side air-fuel ratio sensor 41 is basically set to the first voltage when deterioration of the upstream side catalyst 20 is not being detected. In the example of FIG. 11, the first voltage is 0.45V. 0.45V is the voltage when the output current of the downstream side air-fuel ratio sensor 41 becomes zero when the air-fuel ratio of the outflowing exhaust gas is the stoichiometric air-fuel ratio.

At the time t0 when fuel cut control is being performed, the lean degree of the air-fuel ratio of the outflowing exhaust gas is extremely large, so the output current of the downstream side air-fuel ratio sensor 41 also becomes an extremely large value. At this time, the oxygen storage amount of the upstream side catalyst 20 is the maximum oxygen storage amount. Note that, the "lean degree of the air-fuel ratio" means the difference between an air-fuel ratio leaner than the stoichiometric air-fuel ratio and the stoichiometric air-fuel ratio.

After that, at the time t1, the fuel cut control is ended and rich control is started. After the time t1, if the air-fuel ratio of the inflowing exhaust gas becomes richer than the stoichiometric air-fuel ratio, along with the drop in the oxygen storage amount of the upstream side catalyst 20, the output current of the downstream side air-fuel ratio sensor 41 will gradually fall.

After that, at the time t2, the output current of the downstream side air-fuel ratio sensor 41 reaches zero and it is judged that the air-fuel ratio of the outflowing exhaust gas has reached the stoichiometric air-fuel ratio. For this reason, at the time t2, the voltage applied to the downstream side air-fuel ratio sensor 41 is changed from the first voltage to the second voltage. In the example of FIG. 11, the second voltage is 0.6V higher than the first voltage. As shown in FIG. 8, 0.6V is a voltage whereby the output current of the downstream side air-fuel ratio sensor 41 becomes larger than zero when the air-fuel ratio of the outflowing exhaust gas is the stoichiometric air-fuel ratio.

After the voltage applied to the downstream side air-fuel ratio sensor 41 is changed from the first voltage to the second voltage, the second output current is detected. If the upstream side catalyst 20 has not deteriorated, the second output current Irn is detected. The second output current Irn is the output current of the downstream side air-fuel ratio sensor 41 when the voltage applied to the downstream side air-fuel ratio sensor 41 is 0.6V and the air-fuel ratio of the outflowing exhaust gas is the stoichiometric air-fuel ratio.

On the other hand, if the upstream side catalyst 20 has deteriorated, the second output current Ird is detected. The second output current Ird is the output current of the downstream side air-fuel ratio sensor 41 when the voltage applied to the downstream side air-fuel ratio sensor 41 is 0.6V and the air-fuel ratio of the outflowing exhaust gas is richer than the stoichiometric air-fuel ratio.

If the upstream side catalyst 20 has deteriorated, when the state of the inflowing exhaust gas changes slightly, the rate of purification of unburned gases at the upstream side catalyst 20 falls and the air-fuel ratio of the outflowing exhaust gas becomes slightly richer than the stoichiometric air-fuel ratio. For this reason, the second output current Ird detected when the upstream side catalyst 20 has deteriorated becomes smaller than the second output current Irn detected when the upstream side catalyst 20 has not deteriorated.

Therefore, it is possible to judge the degree of deterioration of the upstream side catalyst 20 based on the second output current. Specifically, in this example, the smaller the second output current, the larger the degree of deterioration of the upstream side catalyst 20 is judged.

After the second output current is detected, at the time t3, the voltage applied to the downstream side air-fuel ratio sensor 41 is returned from the second voltage to the first voltage. If the upstream side catalyst 20 has not deteriorated, the maximum oxygen storage amount of the upstream side catalyst 20 is large. For this reason, so long as the oxygen storage amount of the upstream side catalyst 20 is maintained at a suitable amount, the air-fuel ratio on the surface of the upstream side catalyst 20 is made near the stoichiometric air-fuel ratio by the release of oxygen stored in the upstream side catalyst 20 and the exhaust gas is purified at the upstream side catalyst 20. As a result, after the time t3, the output current of the downstream side air-fuel ratio sensor 41 is maintained at zero until the oxygen storage amount of the upstream side catalyst 20 becomes a predetermined amount or less. That is, the output air-fuel ratio of the downstream side air-fuel ratio sensor 41 is maintained at the stoichiometric air-fuel ratio.

On the other hand, if the upstream side catalyst 20 has deteriorated, the maximum oxygen storage amount of the upstream side catalyst 20 is smaller. For this reason, after the time t3, the air-fuel ratio on the surface of the upstream side catalyst 20 becomes equal to the air-fuel ratio of the inflowing exhaust gas and unburned gases flow out from the upstream side catalyst 20. As a result, after the time t3, the output current of the downstream side air-fuel ratio sensor 41 becomes further smaller. That is, the output air-fuel ratio of the downstream side air-fuel ratio sensor 41 becomes further richer. Note that, the output current of the downstream side air-fuel ratio sensor 41 after the voltage applied to the downstream side air-fuel ratio sensor 41 is returned from the second voltage to the first voltage changes depending on the degree of deterioration of the upstream side catalyst 20 etc., and does not necessarily change as shown in FIG. 11.

Next, an example where the second voltage is lower than the first voltage will be explained. FIG. 12 is a time chart of the type of air-fuel ratio control, the output current of the downstream side air-fuel ratio sensor 41, and the voltage applied to the downstream side air-fuel ratio sensor 41 when detecting deterioration of the catalyst. In the output current of the downstream side air-fuel ratio sensor 41, the solid line shows data regarding the deteriorated upstream side catalyst 20, while the one-dot chain line shows data regarding the nondeteriorated upstream side catalyst 20. In this example as well, the fact that the upstream side catalyst 20 has a rich side deterioration characteristic is known in advance.

Figure 12:
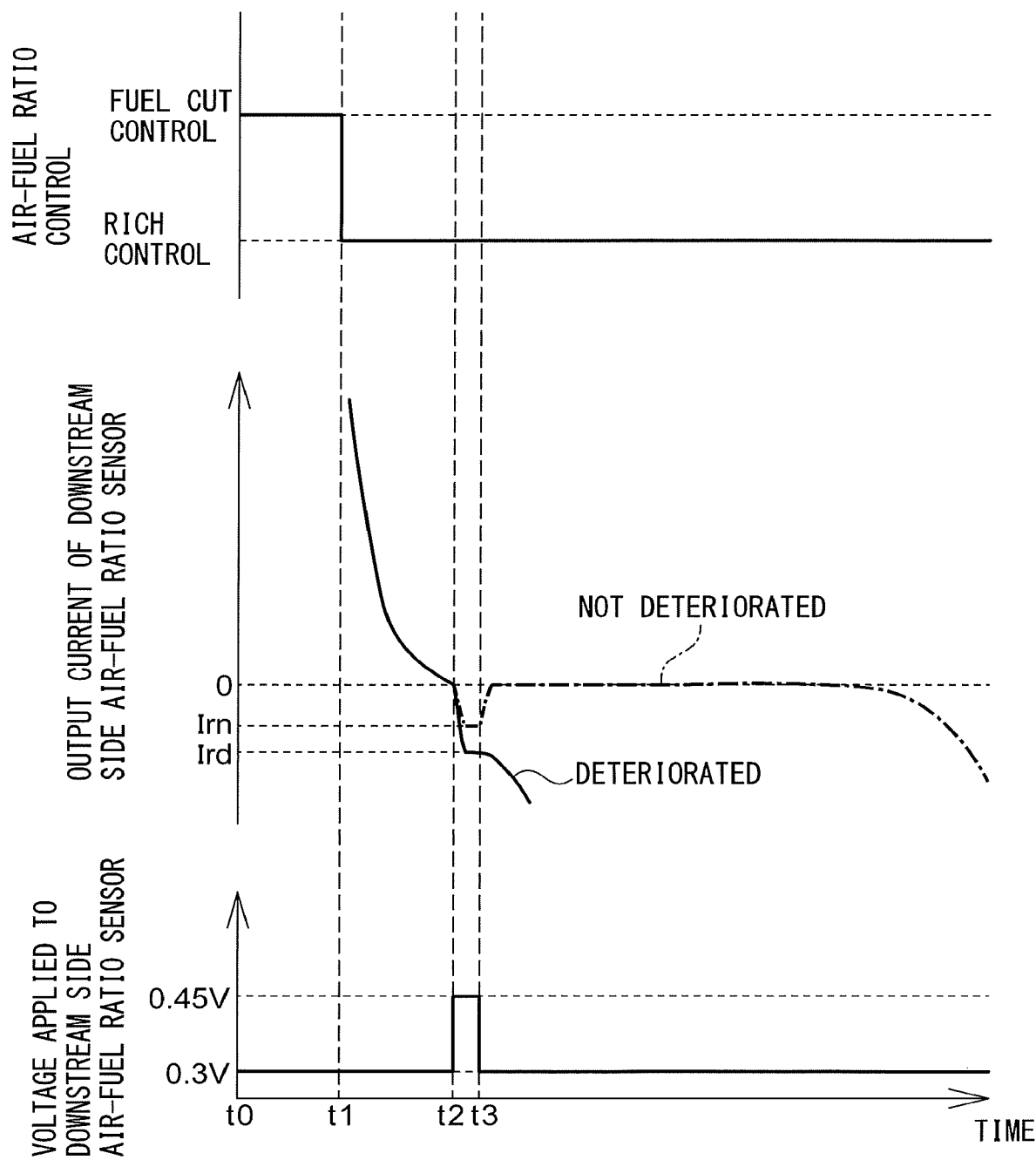
FIG. 12 is a time chart of type of air-fuel ratio control etc., when detecting deterioration of a catalyst.

In the example of FIG. 12, in the same way as the example of FIG. 11, the first voltage is 0.45V. At the time t2, it is judged that the output current of the downstream side air-fuel ratio sensor 41 has reached zero and the air-fuel ratio of the outflowing exhaust gas has reached the stoichiometric air-fuel ratio. For this reason, at the time t2, the voltage applied to the downstream side air-fuel ratio sensor 41 is changed from the first voltage to the second voltage. In the example of FIG. 12, the second voltage is 0.3V which is lower than the first voltage. As shown in FIG. 8, 0.3V is the voltage by which the output current of the downstream side air-fuel ratio sensor 41 becomes smaller than zero when the air-fuel ratio of the outflowing exhaust gas is the stoichiometric air-fuel ratio.

After the voltage applied to the downstream side air-fuel ratio sensor 41 is changed from the first voltage to the second voltage, the second output current is detected. If the upstream side catalyst 20 has not deteriorated, the second output current Irn is detected. The second output current Irn is the output current of the downstream side air-fuel ratio sensor 41 when the voltage applied to the downstream side air-fuel ratio sensor 41 is 0.3V and the air-fuel ratio of the outflowing exhaust gas is the stoichiometric air-fuel ratio.

On the other hand, if the upstream side catalyst 20 has deteriorated, the second output current Ird is detected. The second output current Ird is the output current of the downstream side air-fuel ratio sensor 41 when the voltage applied to the downstream side air-fuel ratio sensor 41 is 0.3V and the air-fuel ratio of the outflowing exhaust gas is richer than the stoichiometric air-fuel ratio.

If the upstream side catalyst 20 has deteriorated, when the state of the inflowing exhaust gas changes slightly, the rate of purification of unburned gas at the upstream side catalyst 20 falls and the air-fuel ratio of the outflowing exhaust gas becomes slightly richer than the stoichiometric air-fuel ratio. For this reason, the second output current Ird detected when the upstream side catalyst 20 has deteriorated becomes smaller than the second output current Irn detected when the upstream side catalyst 20 has not deteriorated.

Therefore, it is possible to judge the degree of deterioration of the upstream side catalyst 20 based on the second output current. Specifically, in this example, the smaller the second output current, the larger the degree of deterioration of the upstream side catalyst 20 is judged. After the second output current is detected, at the time t3, the voltage applied to the downstream side air-fuel ratio sensor 41 is returned from the second voltage to the first voltage.

In this regard, even if the air-fuel ratio of the exhaust gas is constant, due to circuit error, variation will occur in the values of the output currents of the air-fuel ratio sensors 40, 41 between individual specimens of the air-fuel ratio sensors 40, 41. Further, even with the same air-fuel ratio sensors 40 and 41, due to aging etc., variation will occur in the values of the output currents with respect to predetermined air-fuel ratios of the exhaust gas. For this reason, error will occur in the air-fuel ratio of the exhaust gas calculated from the output currents of the air-fuel ratio sensors 40 and 41.

On the other hand, when the output currents of the air-fuel ratio sensors 40 and 41 are zero, no current flows in the electrical circuits, so the circuit error becomes extremely small. For this reason, the air-fuel ratio sensors 40 and 41 can accurately detect the air-fuel ratio corresponding to zero output current.

In the examples of FIG. 11 and FIG. 12, when the air-fuel ratio of the outflowing exhaust gas is the stoichiometric air-fuel ratio, the first voltage is set to a voltage whereby the current output of the downstream side air-fuel ratio sensor 41 becomes zero (0.45V). When the output current of the downstream side air-fuel ratio sensor 41 becomes zero, it is judged that the air-fuel ratio of the outflowing exhaust gas has reached the stoichiometric air-fuel ratio. Due to this, it is possible to accurately detect the air-fuel ratio of the outflowing exhaust gas reaching the stoichiometric air-fuel ratio and possible to accurately detect subsequent fluctuation of the air-fuel ratio of the outflowing exhaust gas. Therefore, it is possible to raise the accuracy of detection of catalyst deterioration.

Processing for Detecting Deterioration of Catalyst

Figure 13:
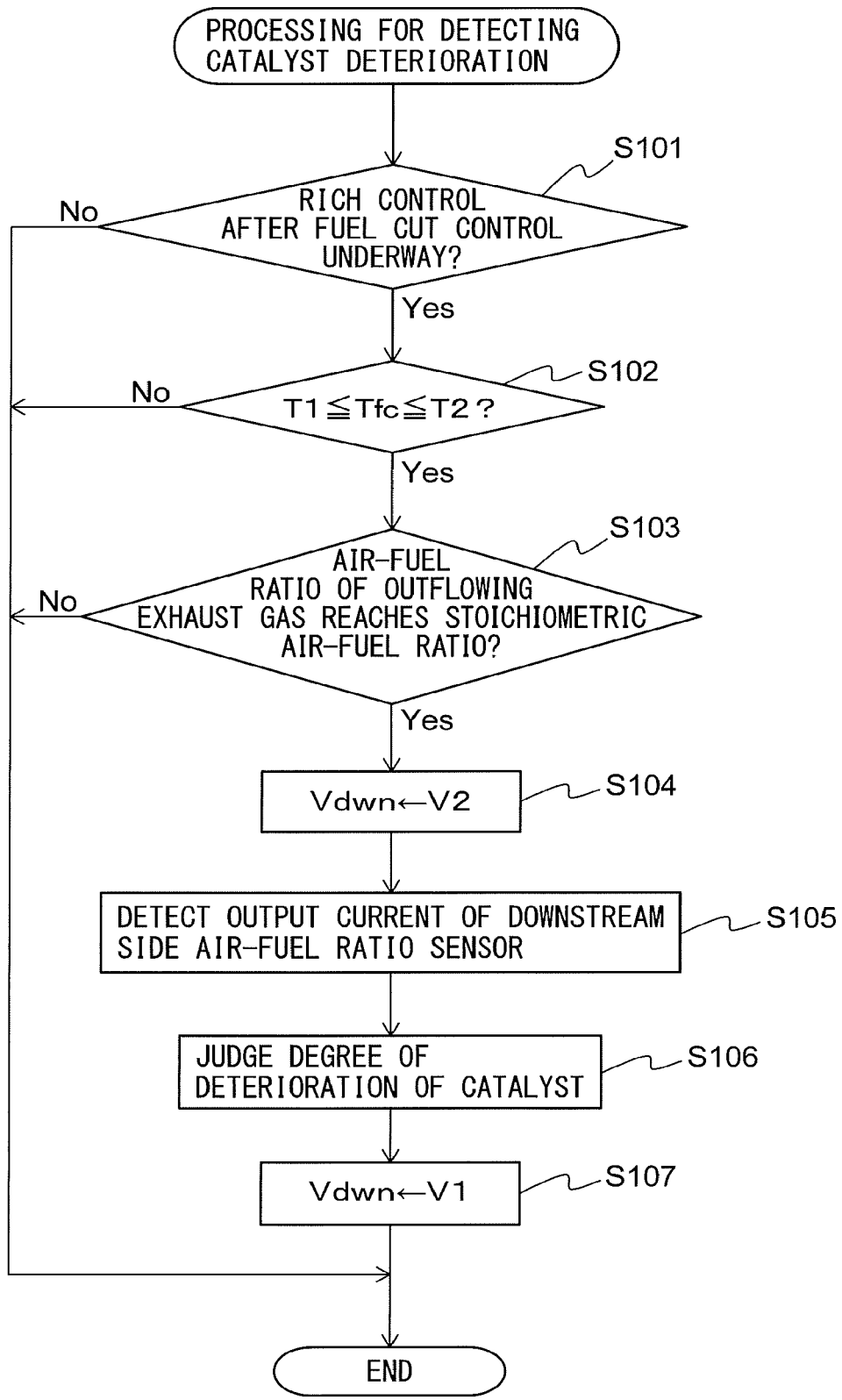
FIG. 13 is a flow chart showing a control routine of processing for detecting deterioration of a catalyst in the first embodiment of the present invention.

Below, referring to the flow chart of FIG. 13, the control for detecting deterioration of the upstream side catalyst 20 in the present embodiment will be explained in detail. FIG. 13 is a flow chart showing a control routine of processing for detecting deterioration of a catalyst in a first embodiment of the present invention. The present control routine is performed repeatedly by the ECU 31 after startup of the internal combustion engine.

First, at step S101, it is judged whether rich control is being performed after fuel cut control. If it is judged that rich control is not being performed after fuel cut control, the present control routine ends. On the other hand, if it is judged that rich control is being performed after fuel cut control, the present control routine proceeds to step S102. Note that, during fuel cut control and rich control, the voltage applied to the downstream side air-fuel ratio sensor 41 is set to the first voltage V1. The first voltage V1 is a voltage in the limit current region.

At step S102, it is judged whether the execution time Tfc of fuel cut control right before rich control is the first time T1 to the second time T2. The first time T1 is determined in advance and is made longer than the time by which it is estimated that fuel cut control will result in the oxygen storage amount of the upstream side catalyst 20 reaching the maximum oxygen storage amount. The second time T2 is determined in advance and is made shorter than the time by which it is estimated that fuel cut control will result in the temperature of the upstream side catalyst 20 becoming less than the activation temperature. The second time T2 is longer than the first time T1.

If at step S102 it is judged that the execution time Tfc of fuel cut control is shorter than the first time T1 or longer than the second time T2, the present control routine ends. On the other hand, if at step S102 it is judged that the execution time Tfc of fuel cut control is the first time T1 to the second time T2, the present control routine proceeds to step S103.

At step S103, it is judged whether the air-fuel ratio of the outflowing exhaust gas has reached the stoichiometric air-fuel ratio. For example, if the output current of the downstream side air-fuel ratio sensor 41 decreases to a value corresponding to near the stoichiometric air-fuel ratio (for example, 14.6±0.01), it is judged that the air-fuel ratio of the outflowing exhaust gas has reached the stoichiometric air-fuel ratio. That is, if the output air-fuel ratio of the downstream side air-fuel ratio sensor 41 reaches near the stoichiometric air-fuel ratio, it is judged that the air-fuel ratio of the outflowing exhaust gas has reached the stoichiometric air-fuel ratio.

If at step S103 it is judged that the air-fuel ratio of the outflowing exhaust gas has not reached the stoichiometric air-fuel ratio, the present control routine ends. On the other hand, if at step S103 it is judged that the air-fuel ratio of the outflowing exhaust gas has reached the stoichiometric air-fuel ratio, the present control routine proceeds to step S104.

At step S104, the voltage Vdwn applied to the downstream side air-fuel ratio sensor 41 is changed from the first voltage V1 to the second voltage V2. The second voltage V2 is a voltage in the limit current region. Next, at step S105, the output current of the downstream side air-fuel ratio sensor 41 is detected by the current detection device 61. Note that, the output current does not change instantaneously by a change of the applied voltage, so the current detection device 61 detects the output current of the downstream side air-fuel ratio sensor 41 after a very small time (for example, 10 to 80 ms) elapses from the change of the applied voltage.

Figure 14:
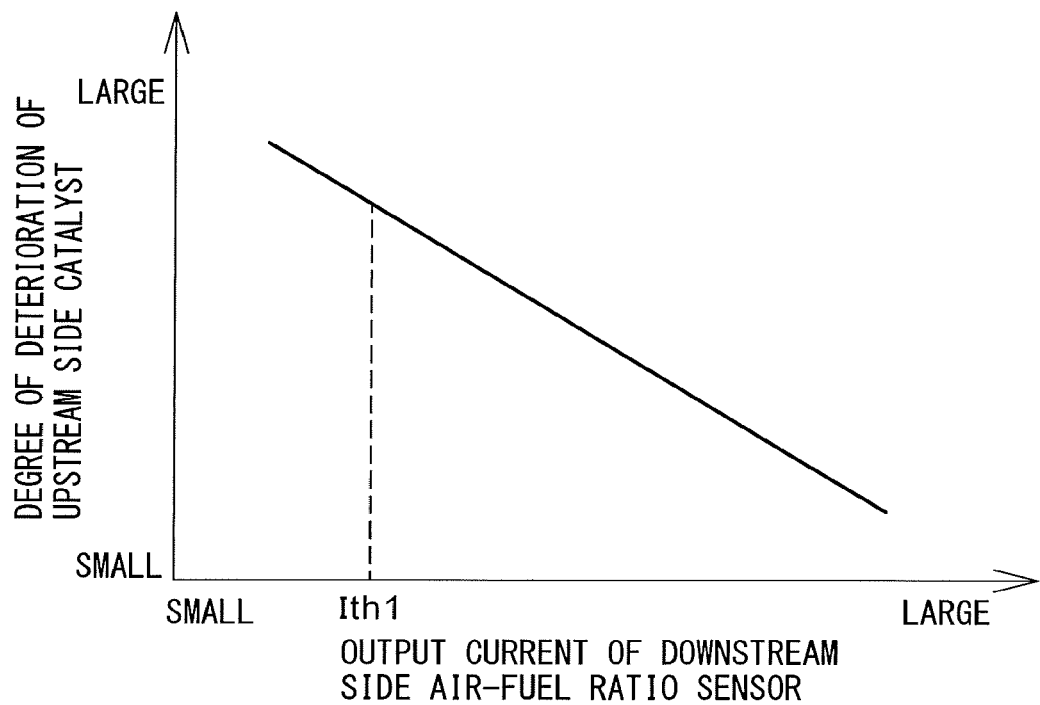
FIG. 14 is a view showing a relationship between an output current of a downstream side air-fuel ratio sensor and a degree of deterioration of the upstream side catalyst.

Next, at step S106, the degree of deterioration of the upstream side catalyst 20 is judged based on the output current of the downstream side air-fuel ratio sensor 41 acquired at step S105. If the upstream side catalyst 20 has a rich side deterioration characteristic, as shown in FIG. 14, the smaller the output current of the downstream side air-fuel ratio sensor 41, the larger the degree of deterioration of the upstream side catalyst 20 is judged. Note that, the deterioration judging part 73 may judge that the upstream side catalyst 20 is deteriorating and turn on a warning light provided at the vehicle mounting the internal combustion engine when the output current of the downstream side air-fuel ratio sensor 41 is the first threshold value Ith1 or less. The first threshold value Ith1 is determined in advance theoretically or experimentally in accordance with the value of the second voltage V2.

Figure 15:
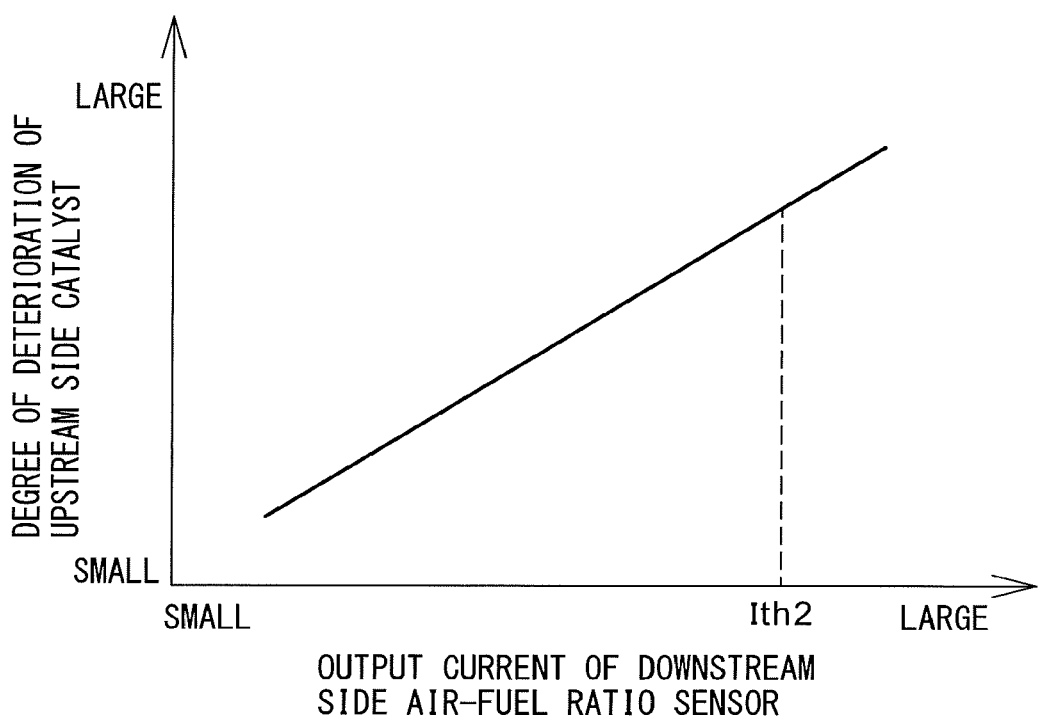
FIG. 15 is a view showing a relationship between an output current of a downstream side air-fuel ratio sensor and a degree of deterioration of the upstream side catalyst.

On the other hand, if the upstream side catalyst 20 has a lean side deterioration characteristic, as shown in FIG. 15, the larger the output current of the downstream side air-fuel ratio sensor 41, the larger the degree of deterioration of the upstream side catalyst 20 is judged. Note that, the deterioration judging part 73 may judge that the upstream side catalyst 20 is deteriorating and turn on a warning light provided at the vehicle mounting the internal combustion engine when the output current of the downstream side air-fuel ratio sensor 41 is the second threshold value Ith2 or more. The second threshold value Ith2 is determined in advance theoretically or experimentally in accordance with the value of the second voltage V2.

Next, at step S107, the voltage Vdwn applied to the downstream side air-fuel ratio sensor 41 is changed from the second voltage V2 to the first voltage V1. Note that, if feedback control is performed using the output current of the downstream side air-fuel ratio sensor 41 of the time when the voltage applied to the downstream side air-fuel ratio sensor 41 is set to the first voltage V1, this such feedback control is stopped while the voltage applied to the downstream side air-fuel ratio sensor 41 is set to the second voltage V2. After step S107, the present control routine ends.

Note that, to judge whether fuel cut control has caused the oxygen storage amount of the upstream side catalyst 20 to reach the maximum oxygen storage amount, at step S102, it may be judged whether the output air-fuel ratio of the downstream side air-fuel ratio sensor 41 is leaner than the stoichiometric air-fuel ratio. Further, at step S105, the output current of the downstream side air-fuel ratio sensor 41 may be detected by the current detection device 61 a plurality of times, and the degree of deterioration of the upstream side catalyst 20 may be judged based on the average value of the detected output currents.

Second Embodiment

The catalyst deterioration detection system according to the second embodiment is basically similar in configuration and control to the catalyst deterioration detection system according to the first embodiment except for the points explained below. For this reason, below, the second embodiment of the present invention will be explained focusing on the parts different from the first embodiment.

The longer the elapsed time from when it is judged that the air-fuel ratio of the outflowing exhaust gas has reached the stoichiometric air-fuel ratio in rich control, conceivably the more the state of the surface of the upstream side catalyst 20 changes and the larger the fluctuation of the outflowing exhaust gas when the air-fuel ratio on the surface of the upstream side catalyst 20 is made near the stoichiometric air-fuel ratio. On the other hand, if the above elapsed time is too long, in particular if the degree of deterioration of the upstream side catalyst 20 is large, the air-fuel ratio on the surface of the upstream side catalyst 20 approaches the air-fuel ratio of the inflowing exhaust gas and it is difficult to detect fluctuation of the outflowing exhaust gas when the air-fuel ratio on the surface of the upstream side catalyst 20 is made near the stoichiometric air-fuel ratio.

For this reason, in the second embodiment, the deterioration judging part 73 judges the degree of deterioration of the upstream side catalyst 20 based on the output current of the downstream side air-fuel ratio sensor 41 detected by the current detection device 61 when the elapsed time from when it was judged that the air-fuel ratio of the outflowing exhaust gas has reached the stoichiometric air-fuel ratio during rich control reaches the reference time and the voltage applied to the downstream side air-fuel ratio sensor 41 is set to the second voltage. The reference time is determined in advance and is 100 ms to 1 sec. By doing this, it is possible to raise the accuracy of detection of deterioration of a catalyst. Further, it is possible to keep the time required for detecting deterioration of the upstream side catalyst 20 from becoming longer.

Note that, the deterioration judging part 73 may judge the degree of deterioration of the upstream side catalyst 20 based on the air-fuel ratio detected by the downstream side air-fuel ratio sensor 41 when the elapsed time from when it was judged that the air-fuel ratio of the outflowing exhaust gas reached the stoichiometric air-fuel ratio during rich control reaches the reference time and the voltage applied to the downstream side air-fuel ratio sensor 41 is set to the second voltage.

Processing for Detecting Deterioration of Catalyst

FIG. 16 is a flow chart showing a control routine of processing for detecting deterioration of a catalyst in the second embodiment of the present invention. The present control routine is repeatedly performed by the ECU 31 after startup of the internal combustion engine.

Step S201 to step S203 are similar to step S101 to step S103 of FIG. 13, so explanations will be omitted. If the judgment at step S201, step S202, or step S203 is negative, the present control routine proceeds to step S209. At step S209, the cumulative time ET from when it was judged that the air-fuel ratio of the outflowing exhaust gas reached the stoichiometric air-fuel ratio is reset to zero. After step S209, the present control routine ends.

If at step S203 it is judged that the air-fuel ratio of the outflowing exhaust gas has reached the stoichiometric air-fuel ratio, the present control routine proceeds to step S204. At step S204, it is judged whether the cumulative time ET is the threshold time Tth or more. If it is judged that the cumulative time ET is less than the threshold time Tth, the present control routine proceeds to step S210.

At step S210, the cumulative time ET is updated. Specifically, the value of the interval of execution Δt of the present control routine added to the cumulative time ET is made the new cumulative time ET. After step S210, the present control routine is ended.

On the other hand, if at step S204 it is judged that the cumulative time ET is the threshold time Tth or more, the present control routine proceeds to step S205. At step S205, the voltage Vdwn applied to the downstream side air-fuel ratio sensor 41 is changed from the first voltage V1 to the second voltage V2. The second voltage V2 is a voltage in the limit current region.

Next, at step S206, the output current of the downstream side air-fuel ratio sensor 41 is detected by the current detection device 61. The threshold time Tth is set so that the elapsed time from when it is judged that the air-fuel ratio of the outflowing exhaust gas has reached the stoichiometric air-fuel ratio at step S203 to when the output current of the downstream side air-fuel ratio sensor 41 is detected by the current detection device 61 at step S206 becomes a reference time. The reference time is 100 ms to 1 second.

Next, at step S207, the degree of deterioration of the upstream side catalyst 20 is judged in the same way as step S106 of FIG. 13 based on the output current of the downstream side air-fuel ratio sensor 41 acquired at step S206. Next, at step S208, the voltage Vdwn applied to the downstream side air-fuel ratio sensor 41 is changed from the second voltage V2 to the first voltage V1 and the cumulative time ET is reset to zero. Note that, if feedback control using the output current of the downstream side air-fuel ratio sensor 41 of the time when the voltage applied to the downstream side air-fuel ratio sensor 41 is set to the first voltage V1 is performed, this feedback control is stopped while the voltage applied to the downstream side air-fuel ratio sensor 41 is set to the second voltage V2. After step S208, the present control routine ends.

Note that, to judge whether fuel cut control has caused the oxygen storage amount of the upstream side catalyst 20 to reach the maximum oxygen storage amount, at step S202, it may be judged whether the output air-fuel ratio of the downstream side air-fuel ratio sensor 41 is leaner than the stoichiometric air-fuel ratio. Further, at step S206, the output current of the downstream side air-fuel ratio sensor 41 may be detected a plurality of times by the current detection device 61 and the degree of deterioration of the upstream side catalyst 20 may be judged based on the average value of the detected output currents.

Further, when it is judged that the air-fuel ratio of the outflowing exhaust gas has reached the stoichiometric air-fuel ratio, the voltage Vdwn applied to the downstream side air-fuel ratio sensor 41 may be changed from the first voltage V1 to the second voltage V2 and step S204 may be performed after step S205. In this case as well, the threshold time Tth is set so that the elapsed time from when it is judged that the air-fuel ratio of the outflowing exhaust gas has reached the stoichiometric air-fuel ratio at step S203 to when the output current of the downstream side air-fuel ratio sensor 41 is detected by the current detection device 61 at step S206 becomes a reference time.

Above, preferred embodiments according to the present invention were explained, but the present invention is not limited to these embodiments and can be modified and changed in various ways within the language of the claims. In the above embodiments, the air-fuel ratio is controlled and deterioration of the catalyst is detected basically based on the output of the downstream side air-fuel ratio sensor 41. Further, harmful substances in the exhaust gas are basically purified at the upstream side catalyst 20. For this reason, the upstream side air-fuel ratio sensor 40 and the downstream side catalyst 24 may be omitted from the internal combustion engine.

Further, the deterioration judging part 73 may judge the degree of deterioration of the upstream side catalyst 20 based on the difference between the output current of the downstream side air-fuel ratio sensor 41 detected by the current detection device 61 when it is judged that the air-fuel ratio of the outflowing exhaust gas has reached the stoichiometric air-fuel ratio and the voltage applied to the downstream side air-fuel ratio sensor 41 is set to the first voltage, and the output current of the downstream side air-fuel ratio sensor 41 detected by the current detection device 61 when the voltage applied to the downstream side air-fuel ratio sensor 41 is set to the second voltage.

Further, the voltage control part 71 may further change the voltage applied to the downstream side air-fuel ratio sensor 41 from the second voltage to a third voltage and the deterioration judging part 73 may judge the degree of deterioration of the upstream side catalyst 20 based on the output current of the downstream side air-fuel ratio sensor 41 detected by the current detection device 61 when the voltage applied to the downstream side air-fuel ratio sensor 41 is set to the second voltage, and the output current of the downstream side air-fuel ratio sensor 41 detected by the current detection device 61 when the voltage applied to the downstream side air-fuel ratio sensor 41 is set to the third voltage. In this case, the deterioration judging part 73, for example, uses a map in which the relationship between the both output currents and the degree of deterioration of the upstream side catalyst 20 is shown so as to judge the degree of deterioration of the upstream side catalyst 20.

REFERENCE SIGNS LIST 1 catalyst deterioration detection system
5 combustion chamber
20 upstream side catalyst
22 exhaust pipe
31 electronic control unit (ECU)
41 downstream side air-fuel ratio sensor
60 voltage application device
61 current detection device
71 voltage control part
72 air-fuel ratio control part
73 deterioration judging part

The invention claimed is:

1. A catalyst deterioration detection system detecting deterioration of a catalyst arranged in an exhaust passage of an internal combustion engine and able to store oxygen, comprising:
an air-fuel ratio sensor arranged at a downstream side of the catalyst and detecting an air-fuel ratio of outflowing exhaust gas flowing out from the catalyst;
a current detector detecting an output current of the air-fuel ratio sensor; and
a controller including circuitry configured to:
apply a voltage to the air-fuel ratio sensor;
control the voltage applied to the air-fuel ratio sensor via the voltage applicator;
control an air-fuel ratio of inflowing exhaust gas flowing into the catalyst; and
judge a degree of deterioration of the catalyst, wherein
the controller is configured to execute a fuel cut control, in which a supply of fuel to a combustion chamber of the internal combustion engine is stopped, when a predetermined execution condition is satisfied, and, after the fuel cut control, execute a rich control making the air-fuel ratio of the inflowing exhaust gas richer than a stoichiometric air-fuel ratio,
the controller is configured to, if judging that the air-fuel ratio of the outflowing exhaust gas has reached the stoichiometric air-fuel ratio when setting the applied voltage to a first voltage in a limit current region during the rich control, change the applied voltage from the first voltage to a second voltage in the limit current region, and
judge the degree of deterioration of the catalyst based on the output current of the air-fuel ratio sensor detected by the current detector when the applied voltage is set to the second voltage.

2. The catalyst deterioration detection system according to claim 1, wherein the first voltage is a voltage whereby the output current of the air-fuel ratio sensor becomes zero when the air-fuel ratio of the outflowing exhaust gas is the stoichiometric air-fuel ratio, and the controller is configured to judge that the air-fuel ratio of the outflowing exhaust gas has reached the stoichiometric air-fuel ratio when the output current of the air-fuel ratio sensor becomes zero.

3. The catalyst deterioration detection system according to claim 2, wherein the controller is configured to judge the degree of deterioration of the catalyst based on the output current of the air-fuel ratio sensor detected by the current detector when an elapsed time, from when it is judged during the rich control that the air-fuel ratio of the outflowing exhaust gas has reached the stoichiometric air-fuel ratio, reaches a reference time and the applied voltage is set to the second voltage, and the reference time is 100 ms to 1 second.

4. The catalyst deterioration detection system according to claim 3, wherein if the catalyst has a characteristic of deterioration whereby an amount of fluctuation of a rate of purification of unburned gases when an air-fuel ratio upstream of the catalyst is made near the stoichiometric air-fuel ratio becomes larger than an amount of fluctuation of a rate of purification of NOX, the controller is configured to judge that the degree of deterioration of the catalyst is larger the smaller the output current of the air-fuel ratio sensor detected by the current detector.

5. The catalyst deterioration detection system according to claim 3, wherein if the catalyst has a characteristic of deterioration whereby an amount of fluctuation of a rate of purification of NOX when an air-fuel ratio upstream of the catalyst is made near the stoichiometric air-fuel ratio becomes larger than an amount of fluctuation of a rate of purification of unburned gas, the controller is configured to judge that the degree of deterioration of the catalyst is larger the larger the output current of the air-fuel ratio sensor detected by the current detector.

6. The catalyst deterioration detection system according to claim 2, wherein if the catalyst has a characteristic of deterioration whereby an amount of fluctuation of a rate of purification of unburned gases when an air-fuel ratio on a upstream of the catalyst is made near the stoichiometric air-fuel ratio becomes larger than an amount of fluctuation of a rate of purification of NOX, the controller is configured to judge that the degree of deterioration of the catalyst is larger the smaller the output current of the air-fuel ratio sensor detected by the current detector.

7. The catalyst deterioration detection system according to claim 2, wherein if the catalyst has a characteristic of deterioration whereby an amount of fluctuation of a rate of purification of NOX when an air-fuel ratio upstream of the catalyst is made near the stoichiometric air-fuel ratio becomes larger than an amount of fluctuation of a rate of purification of unburned gas, the controller is configured to judge that the degree of deterioration of the catalyst is larger the larger the output current of the air-fuel ratio sensor detected by the current detector.

8. The catalyst deterioration detection system according to claim 1, wherein the controller is configured to judge the degree of deterioration of the catalyst based on the output current of the air-fuel ratio sensor detected by the current detector when an elapsed time, from when it is judged during the rich control that the air-fuel ratio of the outflowing exhaust gas has reached the stoichiometric air-fuel ratio, reaches a reference time and the applied voltage is set to the second voltage, and the reference time is 100 ms to 1 second.

9. The catalyst deterioration detection system according to claim 8, wherein if the catalyst has a characteristic of deterioration whereby an amount of fluctuation of a rate of purification of unburned gases when an air-fuel ratio upstream of the catalyst is made near the stoichiometric air-fuel ratio becomes larger than an amount of fluctuation of a rate of purification of NOX, the controller is configured to judge that the degree of deterioration of the catalyst is larger the smaller the output current of the air-fuel ratio sensor detected by the current detector.

10. The catalyst deterioration detection system according to claim 8, wherein if the catalyst has a characteristic of deterioration whereby an amount of fluctuation of a rate of purification of NOX when an air-fuel ratio upstream of the catalyst is made near the stoichiometric air-fuel ratio becomes larger than an amount of fluctuation of a rate of purification of unburned gas, the controller is configured to judge that the degree of deterioration of the catalyst is larger the larger the output current of the air-fuel ratio sensor detected by the current detector.

11. The catalyst deterioration detection system according to claim 1, wherein if the catalyst has a characteristic of deterioration whereby an amount of fluctuation of a rate of purification of unburned gases when an air-fuel ratio upstream of the catalyst is made near the stoichiometric air-fuel ratio becomes larger than an amount of fluctuation of a rate of purification of NOX, the controller is configured to judge that the degree of deterioration of the catalyst is larger the smaller the output current of the air-fuel ratio sensor detected by the current detector.

12. The catalyst deterioration detection system according to claim 1, wherein if the catalyst has a characteristic of deterioration whereby an amount of fluctuation of a rate of purification of NOX when an air-fuel ratio upstream of the catalyst is made near the stoichiometric air-fuel ratio becomes larger than an amount of fluctuation of a rate of purification of unburned gas, the controller is configured to judge that the degree of deterioration of the catalyst is larger the larger the output current of the air-fuel ratio sensor detected by the current detector.

* * * * *